(12) United States Patent
Wilkinson et al.

(10) Patent No.: US 12,103,775 B2
(45) Date of Patent: Oct. 1, 2024

(54) SYSTEMS AND METHODS FOR OBJECT STORAGE AND RETRIEVAL

(71) Applicant: WALMART APOLLO, LLC, Bentonville, AR (US)

(72) Inventors: Bruce W. Wilkinson, Rogers, AR (US); David G. Tovey, Rogers, AR (US); Jason Bellar, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 218 days.

(21) Appl. No.: 17/729,902

(22) Filed: Apr. 26, 2022

(65) Prior Publication Data

US 2022/0250840 A1      Aug. 11, 2022

Related U.S. Application Data

(63) Continuation of application No. 16/670,421, filed on Oct. 31, 2019.

(Continued)

(51) Int. Cl.
*G06D 7/00*    (2006.01)
*B65G 1/04*    (2006.01)
(Continued)

(52) U.S. Cl.
CPC ......... *B65G 1/1371* (2013.01); *B65G 1/0421* (2013.01); *B65G 1/045* (2013.01);
(Continued)

(58) Field of Classification Search
CPC .... B65G 1/1371; B65G 1/0421; B65G 1/045; B65G 2203/046; B65G 2209/04;
(Continued)

(56) References Cited

U.S. PATENT DOCUMENTS 3,737,057 A      6/1973   Neumann
5,065,872 A     11/1991   Simon
(Continued)

FOREIGN PATENT DOCUMENTS

CN    106942915 A    7/2017
CN    107346590     11/2017
(Continued)

OTHER PUBLICATIONS

U.S. Appl. No. 17/729,902, filed Apr. 26, 2022, Bruce W. Wilkinson.
(Continued)

*Primary Examiner* — Yolanda R Cumbess
(74) *Attorney, Agent, or Firm* — Fitch, Even, Tabin & Flannery LLP

(57) ABSTRACT

Described in detail herein is an autonomous object storage and retrieval system. In one embodiment, an object storage and retrieval system includes a computing system hosting a service application and in communication with a database and storage and retrieval apparatuses configured to store and dispense physical objects. Each storage and retrieval apparatus is in communication with the computing system. The computing system can transmit instructions to a first one of the storage and retrieval apparatuses to render the status of the first physical object on the interactive display of the storage and retrieval apparatus.

19 Claims, 14 Drawing Sheets

Related U.S. Application Data

(60) Provisional application No. 62/753,467, filed on Oct. 31, 2018.

(51) Int. Cl.
*B65G 1/137* (2006.01)
*G06K 19/07* (2006.01)
*G06Q 10/08* (2023.01)

(52) U.S. Cl.
CPC ......... *G06K 19/0723* (2013.01); *G06Q 10/08* (2013.01); *B65G 2203/046* (2013.01); *B65G 2209/04* (2013.01)

(58) Field of Classification Search
CPC ...... B65G 2207/30; B65G 1/06; B65G 1/137; G06K 19/0723; G06Q 10/08; G07F 11/165; G07F 11/62; A47G 29/141; A47G 2029/145; A47G 2029/149
USPC .......................................... 700/213–216, 228
See application file for complete search history.

(56) References Cited

U.S. PATENT DOCUMENTS

| | | |
|---|---|---|
| 5,337,920 A | 8/1994 | Clausen |
| 5,478,182 A | 12/1995 | Hildebrand |
| 5,568,393 A | 10/1996 | Ando |
| 5,593,269 A | 1/1997 | Bernard, II |
| 5,674,040 A | 10/1997 | Wagner |
| 6,224,313 B1 | 5/2001 | Fukushima |
| 6,325,775 B1 | 12/2001 | Thom |
| 6,409,449 B1 | 6/2002 | Freudelsperger |
| 6,416,270 B1 | 7/2002 | Steury |
| 6,443,317 B1 | 9/2002 | Brozak, Jr. |
| 6,598,829 B2 | 7/2003 | Kamstra |
| 6,694,217 B2 | 2/2004 | Bloom |
| 6,783,058 B2 | 8/2004 | Quaintance |
| 6,845,873 B1 | 1/2005 | Chattey |
| 6,882,269 B2 | 4/2005 | Moreno |
| 7,010,501 B1 | 3/2006 | Roslak |
| 7,013,198 B2 | 3/2006 | Haas |
| 7,086,558 B1 | 8/2006 | Pixley |
| 7,106,202 B2 | 9/2006 | Dickinson |
| 7,324,921 B2 | 1/2008 | Sugahara |
| 7,360,042 B2 | 4/2008 | Chen |
| 7,870,029 B2 | 1/2011 | Bates |
| 8,145,351 B2 | 3/2012 | Schininger |
| 8,502,644 B1 | 8/2013 | Newman |
| 8,560,406 B1 | 10/2013 | Antony |
| 8,755,930 B2 | 6/2014 | Miller |
| 8,882,432 B2 | 11/2014 | Bastianii |
| 8,920,098 B2 | 12/2014 | Joachim |
| 9,052,992 B2 | 6/2015 | Irwin |
| 9,082,247 B2 | 7/2015 | Turner |
| 9,120,524 B2 | 9/2015 | Ozaki |
| 9,120,624 B1 | 9/2015 | Cassady |
| 9,230,230 B2 | 1/2016 | Gupta |
| 9,242,810 B2 | 1/2016 | Remi |
| 9,443,372 B2 | 9/2016 | Mockus |
| 9,482,522 B2 | 11/2016 | Motoyama |
| 9,516,974 B2 | 12/2016 | Herling |
| 9,517,296 B2 | 12/2016 | Fulkerson |
| 9,604,259 B2 | 3/2017 | Lossov |
| 9,646,280 B2 | 5/2017 | Thomas |
| 9,821,960 B2 | 11/2017 | Issing |
| 9,830,572 B2 | 11/2017 | Wan |
| 9,984,520 B1 | 5/2018 | Heller |
| 10,019,593 B1 | 7/2018 | Patel |
| 10,019,693 B1 | 7/2018 | Wolf |
| 10,043,151 B1 | 8/2018 | Zhu |
| 10,114,996 B2 | 10/2018 | Lossov |
| 10,187,542 B1 | 1/2019 | Fielding |
| 10,303,133 B1 * | 5/2019 | Dhalla ............... G05B 19/00 |
| 10,357,804 B2 | 7/2019 | Must |
| 10,621,401 B2 | 4/2020 | Lossov |
| 11,397,910 B2 | 7/2022 | Durkee |
| 11,893,530 B2 | 2/2024 | Durkee |
| 2002/0032501 A1 | 3/2002 | Tilles |
| 2002/0035515 A1 | 3/2002 | Moreno |
| 2002/0165787 A1 | 11/2002 | Bates |
| 2003/0038097 A1 | 2/2003 | Palder |
| 2003/0046166 A1 | 3/2003 | Liebman |
| 2003/0065421 A1 | 4/2003 | Didriksen |
| 2003/0065898 A1 | 4/2003 | Flamma |
| 2003/0093333 A1 | 5/2003 | Veeneman |
| 2004/0037680 A1 | 2/2004 | Sato |
| 2004/0069572 A1 | 4/2004 | Jaspers |
| 2004/0175258 A1 | 9/2004 | Haas |
| 2004/0238326 A1 | 12/2004 | Lichti |
| 2004/0260665 A1 | 12/2004 | Hamilton |
| 2005/0000974 A1 | 1/2005 | Chirnomas |
| 2005/0021173 A1 | 1/2005 | Pinney |
| 2005/0038712 A1 | 2/2005 | Veeneman |
| 2005/0053450 A1 | 3/2005 | Kantola |
| 2005/0211768 A1 | 9/2005 | Stillman |
| 2006/0045660 A1 | 3/2006 | Di Rosa |
| 2007/0025830 A1 | 2/2007 | Solomon |
| 2007/0032903 A1 | 2/2007 | Tsujimoto |
| 2007/0150375 A1 | 6/2007 | Yang |
| 2007/0187183 A1 | 8/2007 | Saigh |
| 2007/0284442 A1 | 12/2007 | Herskovitz |
| 2007/0293978 A1 | 12/2007 | Wurman |
| 2008/0135574 A1 | 6/2008 | Hieb |
| 2008/0260504 A1 | 10/2008 | Gifford |
| 2009/0211962 A1 | 8/2009 | Min |
| 2010/0076591 A1 | 3/2010 | Lert, Jr. |
| 2010/0138037 A1 | 6/2010 | Adelberg |
| 2010/0253190 A1 | 10/2010 | Li |
| 2011/0178633 A1 | 7/2011 | Marrese |
| 2012/0024160 A1 | 2/2012 | Van Os |
| 2012/0027547 A1 | 2/2012 | Jaeger |
| 2012/0123587 A1 | 5/2012 | Mockus |
| 2012/0303154 A1 | 11/2012 | Stiernagle |
| 2013/0092700 A1 | 4/2013 | Braunstein |
| 2013/0131863 A1 | 5/2013 | Hoersten |
| 2013/0167311 A1 | 7/2013 | Johnson |
| 2013/0184854 A1 | 7/2013 | Bastian, II |
| 2013/0238115 A1 | 9/2013 | Smith |
| 2014/0021253 A1 | 1/2014 | Carson |
| 2014/0037404 A1 | 2/2014 | Hancock |
| 2014/0079518 A1 | 3/2014 | Qi |
| 2014/0089085 A1 | 3/2014 | Mueller |
| 2014/0100942 A1 | 4/2014 | Konevic |
| 2014/0190914 A1 | 7/2014 | Nagel |
| 2014/0278603 A1 | 9/2014 | Lievens |
| 2014/0316916 A1 | 10/2014 | Hay |
| 2014/0330603 A1 | 11/2014 | Corder |
| 2015/0032252 A1 | 1/2015 | Galluzzo |
| 2015/0034713 A1 | 2/2015 | Jones |
| 2015/0088307 A1 * | 3/2015 | Ackerman ........... G06Q 10/087 700/241 |
| 2015/0088731 A1 | 3/2015 | Ackerman |
| 2015/0106291 A1 | 4/2015 | Robinson |
| 2015/0106295 A1 | 4/2015 | Robinson |
| 2015/0106296 A1 | 4/2015 | Robinson |
| 2015/0120094 A1 | 4/2015 | Kimchi |
| 2015/0120602 A1 | 4/2015 | Huffman |
| 2015/0158679 A1 | 6/2015 | Lossov |
| 2015/0186840 A1 | 7/2015 | Torres |
| 2015/0265124 A1 | 9/2015 | Chen |
| 2015/0266672 A1 | 9/2015 | Lert |
| 2015/0310694 A1 | 10/2015 | Will |
| 2015/0339625 A1 | 11/2015 | Agasti |
| 2015/0343494 A1 | 12/2015 | Lossov |
| 2015/0356664 A1 | 12/2015 | Mackler |
| 2015/0371187 A1 | 12/2015 | Irwin |
| 2015/0379464 A1 | 12/2015 | Turner |
| 2015/0379554 A1 | 12/2015 | Copeland |
| 2016/0125508 A1 | 5/2016 | Carr |
| 2016/0130086 A1 | 5/2016 | Yamashita |
| 2016/0194152 A1 | 7/2016 | Lo Iacono |
| 2016/0229633 A1 | 8/2016 | Yamashita |
| 2016/0236865 A1 | 8/2016 | Altemir |

(56) References Cited

U.S. PATENT DOCUMENTS

| | | |
|---|---|---|
| 2016/0247702 A1 | 8/2016 | Adachi |
| 2016/0327941 A1 | 11/2016 | Stiernagle |
| 2017/0010609 A1 | 1/2017 | High |
| 2017/0073159 A1 | 3/2017 | Lossov |
| 2017/0088355 A1 | 3/2017 | Khodl |
| 2017/0091704 A1 | 3/2017 | Wolf |
| 2017/0091710 A1 | 3/2017 | Van Dyke |
| 2017/0124547 A1 | 5/2017 | Natarajan |
| 2017/0147975 A1 | 5/2017 | Natarajan |
| 2017/0200117 A1 | 7/2017 | High |
| 2017/0323250 A1 | 11/2017 | Lindbo |
| 2018/0014438 A1 | 1/2018 | Bilato |
| 2018/0041493 A1 | 2/2018 | Wilkinson |
| 2018/0060800 A1 | 3/2018 | Robinson |
| 2018/0060812 A1 | 3/2018 | Robinson |
| 2018/0068139 A1 | 3/2018 | Aalund |
| 2018/0089619 A1 | 3/2018 | High |
| 2018/0121872 A1 | 5/2018 | Walsh |
| 2018/0121873 A1 | 5/2018 | Walsh |
| 2018/0130017 A1 | 5/2018 | Gupte |
| 2018/0135337 A1 | 5/2018 | Johnson |
| 2018/0144296 A1 | 5/2018 | Engel |
| 2018/0172799 A1 | 6/2018 | Meadow |
| 2018/0174101 A1 | 6/2018 | Mattingly |
| 2018/0177318 A1 | 6/2018 | Chambers |
| 2018/0186454 A1 | 7/2018 | Luckay |
| 2018/0190062 A1 | 7/2018 | Robinson |
| 2018/0244469 A1 | 8/2018 | Testa |
| 2018/0251302 A1 | 9/2018 | Valinsky |
| 2018/0300679 A1 | 10/2018 | Mahmood |
| 2018/0305125 A1 | 10/2018 | Guo |
| 2018/0365641 A1 | 12/2018 | Zhu |
| 2019/0012639 A1 | 1/2019 | Boothman |
| 2019/0024302 A1 | 1/2019 | Jang |
| 2019/0031441 A1 | 1/2019 | Jin |
| 2019/0112119 A1 | 4/2019 | Alexander |
| 2019/0114585 A1 | 4/2019 | Fee |
| 2019/0114859 A1 | 4/2019 | Fee |
| 2019/0147397 A1 | 5/2019 | Hodges |
| 2019/0188936 A1 | 6/2019 | Sivill |
| 2019/0213540 A1 | 7/2019 | Petroski |
| 2019/0220815 A1 | 7/2019 | Nelson |
| 2019/0313828 A1 | 10/2019 | Schmider |
| 2019/0337719 A1 | 11/2019 | Tovey |
| 2019/0344965 A1 | 11/2019 | Wilkinson |
| 2019/0352095 A1 | 11/2019 | Tovey |
| 2019/0370744 A1 | 12/2019 | Fee |
| 2019/0375594 A1 | 12/2019 | Tovey |
| 2020/0002093 A1 | 1/2020 | Tovey |
| 2020/0005226 A1 | 1/2020 | Sikka |
| 2020/0012245 A1 | 1/2020 | Marin Pulido |
| 2020/0017298 A1 | 1/2020 | Durkee |
| 2020/0017299 A1 | 1/2020 | Durkee |
| 2020/0017300 A1 | 1/2020 | Durkee |
| 2020/0019929 A1 | 1/2020 | Chaney |
| 2020/0172337 A1 | 6/2020 | Wilkinson |
| 2020/0193373 A1 | 6/2020 | Varman |
| 2020/0226539 A1 | 7/2020 | Durkee |
| 2020/0239229 A1 | 7/2020 | Tovey |
| 2020/0250614 A1 | 8/2020 | Zhu |
| 2020/0250615 A1 | 8/2020 | Fee |
| 2020/0293990 A1 | 9/2020 | Mak |
| 2020/0317446 A1 | 10/2020 | Tovey |
| 2020/0394375 A1 | 12/2020 | Lõssov |
| 2021/0004758 A1 | 1/2021 | Durkee |
| 2021/0074100 A1 | 3/2021 | Kashi |
| 2021/0142277 A1 | 5/2021 | Fee |
| 2022/0127078 A1 | 4/2022 | Durkee |
| 2022/0292453 A1 | 9/2022 | Durkee |
| 2022/0306385 A1 | 9/2022 | Tovey |
| 2023/0394425 A1 | 12/2023 | Chaney |
| 2024/0116713 A1 | 4/2024 | Durkee |
| 2024/0119405 A1 | 4/2024 | Durkee |

FOREIGN PATENT DOCUMENTS

| | | |
|---|---|---|
| CN | 107454863 | 12/2017 |
| CN | 107814122 | 3/2018 |
| DE | 4339056 | 5/1995 |
| EM | 0021045470001 | 9/2012 |
| EM | 0027572450001 | 8/2015 |
| EM | 0027572450002 | 8/2015 |
| EM | 0027572450003 | 8/2015 |
| EM | 0036406890001 | 1/2017 |
| EM | 0037930660001 | 3/2017 |
| EM | 0034029650001 | 7/2017 |
| EM | 0041697610001 | 8/2017 |
| EP | 2881905 | 6/2015 |
| EP | 2950282 | 12/2015 |
| EP | 3142085 | 3/2017 |
| EP | 3255596 | 12/2017 |
| GB | 2175575 A | 12/1986 |
| GB | 2409748 | 7/2005 |
| GB | 2430608 | 4/2007 |
| GB | 2430705 | 4/2007 |
| GB | 2437967 | 11/2007 |
| GB | 2491340 | 12/2012 |
| GB | 2564313 | 1/2019 |
| GB | 2590246 | 6/2021 |
| GB | 2590266 | 6/2021 |
| GB | 2590267 | 6/2021 |
| GB | 2590268 | 6/2021 |
| JP | 2017048014 A | 3/2017 |
| WO | 1995011829 | 5/1995 |
| WO | 1998007641 | 2/1998 |
| WO | 2001018395 | 3/2001 |
| WO | 2001097101 | 12/2001 |
| WO | 2002007021 | 1/2002 |
| WO | 2002074634 | 9/2002 |
| WO | 2003046782 | 6/2003 |
| WO | 2006136108 A1 | 12/2006 |
| WO | 2008104731 | 9/2008 |
| WO | 2015019377 | 2/2015 |
| WO | 2015037923 A1 | 3/2015 |
| WO | 2015044692 | 4/2015 |
| WO | 2016176464 A1 | 11/2016 |
| WO | 2017081550 | 5/2017 |
| WO | 2017163018 | 9/2017 |
| WO | 2019212853 | 11/2019 |
| WO | 2019222246 | 11/2019 |
| WO | 2020014373 | 1/2020 |
| WO | 2020014374 | 1/2020 |
| WO | 2020014608 | 1/2020 |
| WO | 2020014615 | 1/2020 |
| WO | 2020092790 | 5/2020 |
| WO | 2020118227 | 6/2020 |

OTHER PUBLICATIONS

U.S. Appl. No. 17/826,568, filed May 27, 2022, Paul Edward Durkee.
U.S. Appl. No. 17/839,183, filed Jun. 13, 2022, David G. Tovey.
U.S. Appl. No. 17/841,982, filed Jun. 16, 2022, Paul Edward Durkee.
Benofficial, Walmart's new Cleveron Pickup Machine in action, 3p, Dec. 21, 2017, Youtube, https://www.youtube.com/watch?v=c6amWJISqH0, retrieved Jul. 8, 2020.
Benofficial, Walmart's new Cleveron pickup machine in action, published Dec. 21, 2017, retrieved from https://www.youtube.com/watch?v=c6amWJISqH0 on Jul. 8, 2020, 5 pages.
Boeing Invests in Matternet, Matternet, https://mttr.net/, Jun. 26, 2018, 4 pages.
Channel 8 KLKN-TV, Walmart unveils pick up tower, published Jun. 29, 2018, retrieved from <https://www.youtube.com/watch?v=P8HOrzxT6yE> on Jul. 8, 2020, 2 pages.
Click and collect pickup automation for retail and logistics, Cleveron, https://cleveron.eu/, 2018, 5 pages.
Cleveron AS Automated Parcel Machine PackRobot With Smart Storage System. Product Sheet www.cleveron.eu/packrobot. retrieved from web.archive.org/web/20160910094527/http://www.cleveron.eu/packrobot#videosection. Published at least as early as Sep. 10, 2016, 3 pages.

(56) References Cited

OTHER PUBLICATIONS

Cleveron AS, Cleveron 10, published Nov. 15, 2017, retrieved from <https://www.youtube.com/watch?v=gz3WrYa1Zbs> on Jul. 8, 2020, 4 pages.
Cleveron AS, Cleveron highlights the lack of drone delivery legislation at Digital Summit Tallinn, Sep. 26, 2017 https://cleveron.com/news/cleveron-digital-summit; 3p.
Cleveron AS, Cleveron Introduction 2016. published Jun. 14, 2016, retrieved from https://www.youtube.com/watch?v=ly4K_yWCXRg on Jul. 8, 2020, 4 pages.
Cleveron AS, Courier loading operations at Cleveron's Parcel Terminal, published Nov. 6, 2012, retrieved from <https://www.youtube.com/watch?v=qgQ0f-bTQ1o> on Jul. 8, 2020, 2 pages.
Cleveron AS, Multiload system of Cleveron's PackRobot, published Sep. 26, 2012, retrieved from <https://www.youtube.com/watch?v=I31M3V-8saE> on Jul. 8, 2020, 2 pages.
Cleveron AS, Pack robot Cleveron 401, 5p, Sep. 15, 2015, You-tube, https://www.youtube.com/watch?v=-iyT2hGrF0c, retrieved Jul. 8, 2020.
Cleveron AS, Pack robot Cleveron 401, published Sep. 15, 2015, retrieved from <https://www.youtube.com/watch?v=-iyT2hGrF0c> on Jul. 8, 2020, 2 pages.
Cleveron AS, Smart POST ETV Feb. 28, 2010, published Mar. 16, 2010, retrieved from <https://www.youtube.com/watch?v=K-hNRJGZkEY> on Jul. 8, 2020, 2 pages.
Cleveron AS; SmartPOST ETV Feb. 28, 2010. Mar. 16, 2010, screenshots 2:25, 2:26, 2:35 2p. https://youtu.be/K-hNRJGZkEY, 2 pages.
Cleveron, Automated parcel Machine PackRobot with smart storage system. Product sheet. Published at least as early as Sep. 20, 2016 at www.cleveron.eu/packrobot; and at https://issuu.com/cleveron/docs/pr16002_1_tooteleht on Apr. 10, 2017, 4 pages.
Hointer, The Hointer Experience. Retrieved online at: https://www.youtube.com/watch?v=i9348H-mw4. 2 pages, Mar. 21, 2014.
Intelligent, Intuitive and Interconnected Vending Machings, SAP Blogs, https://blogs.sap.com/2015/04/16/intelligent-intuitive-and-interconnected-vending-machines/, Apr. 16, 2015, 7 pages.
International Search Report and Written Opinion for Application No. PCT/US2019/032263, dated Aug. 6, 2019, 8 pages.
International Search Report and Written Opinion for Application No. PCT/US2019/032893, dated Jul. 29, 2019, 11 pages.
International Search Report and Written Opinion for Application No. PCT/US2019/041222, dated Oct. 9, 2019, 12 pages.
International Search Report and Written Opinion for Application No. PCT/US2019/041223, dated Oct. 8, 2019, 10 pages.
International Search Report and Written Opinion for Application No. PCT/US2019/041596, dated Oct. 9, 2019, 13 pages.
International Search Report and Written Opinion for Application No. PCT/US2019/041599, dated Sep. 30, 2019, 12 pages.
International Search Report and Written Opinion for Application No. PCT/US2019/041610, dated Oct. 9, 2019, 10 pages.
International Search Report and Written Opinion for PCT/US2019/29099, dated Aug. 1, 2019, pp. 1-16.
International Search Report and Written Opinion from related International Patent Application No. PCT/US2019/035814 issued Aug. 22, 2019, 41 pages.
International Search Report and Written Opinion from related International Patent Application No. PCT/US2019/039484 issued Sep. 16, 2019, 18 pages.
International Search Report and Written Opinion from related International Patent Application No. PCT/US2019/044896 issued Oct. 29, 2019, 13 pages.
International Search Report and Written Opinion from related International Patent Application No. PCT/US2019/059197 issued Jan. 17, 2020, 17 pages.
International Search Report and Written Opinion from related International Patent Application No. PCT/US2019/065028 issued Feb. 21, 2020, 12 pages.
K. L. Choy G. T. S. Ho . C. K. H. Lee, A RFID-based storage assignment system for enhancing the efficiency of order picking, Published online: Sep. 19, 2014, J Intell Manuf (2017) 28:111-129 (Year: 2014).
PackRobot: robotics based most efficient parcel terminal, Cleveron, http://cleveron.eu/packrobot/#1490003126030-5c15306f-a9f0, 2017, 9 pages.
Palm, Zara tests out a new kiosk designed to hold packages for customers who make online orders. Retrieved online at: https://www.psfk.com/2018/01/zara-self-service-kiosks-online-orders.html. 6 pages, Jan. 2, 2018.
Peterson, Hayley, Walmart is unleashing 2 key weapons against Amazon in 700 stores, Business Insider, Apr. 5, 2018, 11 pages, retrieved from <https://www.businessinsider.com/walmart-online-pickup-tower-review-2017-8> on Jul. 8, 2020, 11 pages.
Peterson, Walmart is building giant towers to solve the most annoying thing about online ordering. Business insider. Retrieved online at: https://www.businessinsider.in. 8 pages, Jul. 5, 2017.
Simplifying Cloud-Connected Vending Machines, Intelligent Vending with Intel® IoT Retail Gateway, https://www.intel.in/content/www/in/en/embedded/retail/vending/iot-gateway-for-intelligent-vending/overview.html, last viewed Aug. 16, 2018, 4 pages.
Smolnikov, Teleitems Robotic Parcel Terminal Promo, https://www.youtube.com/watch?v=mXL_c5oT9Rc, published Jul. 21, 2017, 1 page.
Technology Breaking News, Walmart adds 500 Pickup Towers to its stores across the US, published Apr. 27, 2018, retrieved from <https://www.youtube.com/watch?v=wbrw9BEIqrY> on Jul. 8, 2020, 2 pages.
U.S. Appl. No. 16/394,677; Office Action mailed Nov. 2, 2020.
U.S. Appl. No. 16/411,917; Notice of Allowance mailed May 13, 2021.
U.S. Appl. No. 16/411,917; Office Action mailed Jan. 11, 2021.
U.S. Appl. No. 16/433,597; Notice of Allowance mailed Mar. 22, 2021.
U.S. Appl. No. 16/454,961; Notice of Allowance mailed Feb. 5, 2021.
U.S. Appl. No. 16/507,988; Non-Final Rejection mailed Nov. 19, 2021; (pp. 1-20).
U.S. Appl. No. 16/507,998; Notice of Allowance mailed Jun. 21, 2021.
U.S. Appl. No. 16/507,998; Notice of Allowance mailed Oct. 12, 2021; (5 pages).
U.S. Appl. No. 16/510,114; Notice of Allowance and Fees Due (PTOL-85) mailed Mar. 23, 2022; (13 pages).
U.S. Appl. No. 16/510,114; Notice of Allowance and Fees Due (PTOL-85) mailed Apr. 11, 2022; (2 pages).
U.S. Appl. No. 16/510,114; Office Action mailed May 26, 2021; (12 pages).
U.S. Appl. No. 16/510,114; Office Action mailed Oct. 8, 2021; (11 pages).
U.S. Appl. No. 16/510,151; Final Rejection mailed Jan. 27, 2022; (24 pages).
U.S. Appl. No. 16/510,151; Office Action mailed Jun. 15, 2021; (18 pages).
U.S. Appl. No. 16/510,151; Office Action mailed Sep. 22, 2021; (21 pages).
U.S. Appl. No. 16/510,151; Office Action mailed Dec. 23, 2021; (23 pages).
U.S. Appl. No. 16/510,179; Non-Final Rejection mailed Oct. 28, 2021; (17 pages).
U.S. Appl. No. 16/510,179; Notice of Allowance and Fees Due (PTOL-85) mailed Feb. 14, 2022; (6 pages).
U.S. Appl. No. 16/510,179; Office Action mailed Jun. 21, 2021; (18 pages).
U.S. Appl. No. 16/530,390; Office Action mailed Feb. 2, 2021; (10 pages).
U.S. Appl. No. 16/670,421; Notice of Allowance and Fees Due (PTOL-85) mailed Jan. 26, 2022; (pp. 1-5).
U.S. Appl. No. 16/670,421; Office Action mailed Sep. 28, 2021; (pp. 1-17).
U.S. Appl. No. 16/706,303; Non-Final Rejection mailed Mar. 16, 2022; (pp. 1-20).

(56) References Cited

OTHER PUBLICATIONS

U.S. Appl. No. 16/843,325; Notice of Allowance and Fees Due (PTOL-85) mailed Mar. 14, 2022; (pp. 1-10).
U.S. Appl. No. 16/507,988; Final Rejection mailed Aug. 23, 2022; (pp. 1-21).
U.S. Appl. No. 16/706,303; Final Rejection mailed Jun. 30, 2022; (pp. 1-19).
Vidmar, Stanley, Tower System provides automated storage and retrieval., Mar. 30, 2005, https://news.thomasnet.com/fullstory/tower-system-provides-automated-storage-and-retrieval-461698 (Year: 2005), 5 pages.
ZDNet, Walmart rolls out 500 more vending machines for online order pickups | ZDNet, published Jun. 3, 2018, retrieved from <https://www.youtube.com/watch?v=WtSnq9_CExY> on Jul. 8, 2020, 2 pages.
U.S. Appl. No. 18/545,141, filed Dec. 19, 2023, Durkee Paul Edward.
U.S. Appl. No. 18/545,149, filed Dec. 19, 2023, Durkee Paul Edward.
Agarwal, Vlvek, Report: Assessing the benefits of Auto-ID Technology in the Consumer Goods Industry, Cambridge University Auto ID center, University of Cambridge. (Year: 2001).
Drew Menard, "New high-tech book retrieval system enhances library resources", Jul. 19, 2013, liberty.edu, 6 pages (Year: 2013).
Nicole Dube, "E-Cigarettes and Minors", Jan. 19, 2018, cga.ct.gov, 4 pages, (Year: 2018).
Pipatprapa, Anirut, "QR Code on Mobile Platform for Improving Order Picking Process of Lean Factory Warehouse," 2019, International Journal of Innovation, Management and Technology 10.1 (2019): 56-60. (Year: 2019).

\* cited by examiner

SYSTEMS AND METHODS FOR OBJECT STORAGE AND RETRIEVAL

RELATED APPLICATION

This application is a continuation of U.S. application Ser. No. 16/670,421 filed Oct. 31, 2019, which claims priority to and the benefit of U.S. Provisional Application No. 62/753,467, filed on Oct. 31, 2018, which are incorporated herein by reference in their entireties.

BACKGROUND

Physical objects can be stored in various locations. Retrieving the physical objects can be inefficient when the location is unknown.

BRIEF DESCRIPTION OF DRAWINGS

Illustrative embodiments are shown by way of example in the accompanying drawings and should not be considered as a limitation of the present disclosure.

DETAILED DESCRIPTION

Figure 1A:
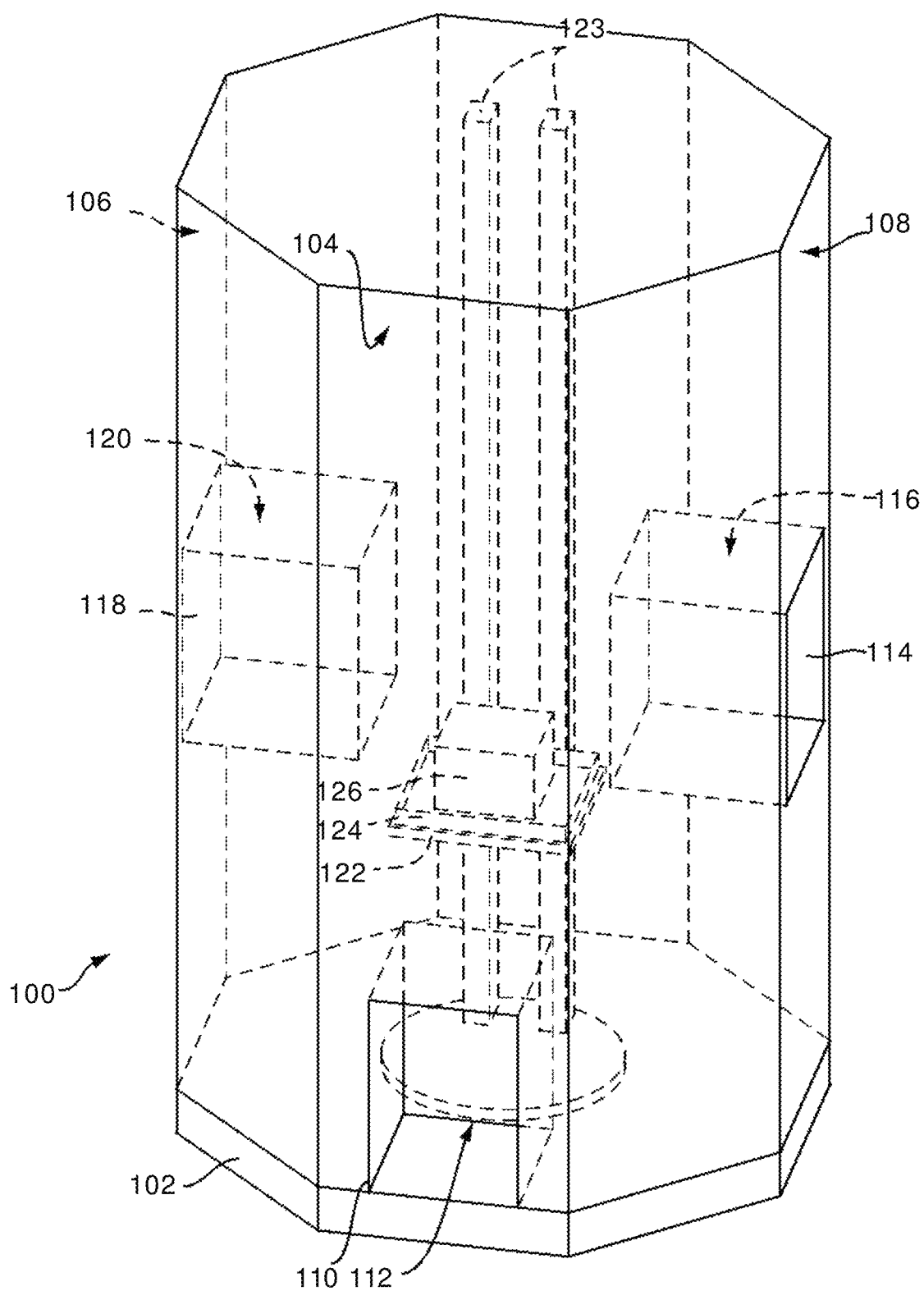
FIG. 1A is a schematic diagram of an exemplary storage and retrieval apparatus in accordance with an exemplary embodiment.

Described in detail herein is an autonomous object storage and retrieval system. Embodiments of the system can include storage and retrieval apparatuses, such as storage towers, storage lockers, and/or other storage and retrieval apparatuses configured to store and dispense physical objects. Each of the storage towers can include a housing including storage areas disposed within the housing, a controller, an input device, and an interactive display. A first storage and retrieval apparatus can be configured to receive information for one or more supplemental physical objects based on identities of a first set of physical objects external to the first storage and retrieval apparatus. The first storage and retrieval apparatus can determine that the one or more supplemental physical objects are not within the first storage and retrieval apparatus, and transmit a request to at least a second storage and retrieval apparatus for the one or more supplemental physical objects. The first storage and retrieval apparatus can render a message on the display indicating a location of the one or more supplemental physical objects in the second storage and retrieval apparatus or can receive the one or more supplemental physical objects from the second storage and retrieval apparatus for storage or dispensing. For example, the one or more supplemental physical objects can be autonomously transported from the second storage and retrieval apparatus to the first storage and retrieval apparatus in response to the request. The first storage and retrieval apparatus can further be configured to generate an alert for the user to indicate that the one or more supplemental physical objects are available at the first storage and retrieval apparatus after the one or more supplemental physical objects are transferred to the first storage and retrieval apparatus.

In one embodiment, one or more terminals can be in communication with the storage and retrieval apparatuses. The one or more terminals can be configured to receive information associated with the first set of physical objects interfacing with the one or more terminals, receive information associated with the one or more supplemental physical objects based on the information associated with the first set of physical objects; and transmit the information associated with the one or more supplemental physical objects to the first storage and retrieval apparatus.

In one embodiment, a computing system including a database can be in communication with the storage and retrieval apparatuses. The storage and retrieval apparatuses can include a reader. The first storage and retrieval apparatus can be configured to read one or more machine-readable elements or one or more radiofrequency identifier (RFID) tags disposed on the first set of physical objects, as a cart including the first set of physical objects traverses past a reader associated with the first storage and retrieval apparatus, and transmit one or more identifiers associated with the one or more machine readable elements or the one or more RFID tags read by the reader to the computing system. The computing system can be configured to query the database using the one or more identifiers to retrieve the information associated with the first set of physical objects, identify the one or more supplemental physical objects based on the information associated with the first set of physical objects, and transmit information associated the one or more supplemental physical objects to the first storage and retrieval apparatus.

In one embodiment, a user device including an optical scanner can be configured to execute an application; and scan identifiers associated with first set of physical objects using the optical scanner. For example, the user can install the user and authorize the application to perform certain functions via the user device. The user can choose to opt-in or opt out of various operations and/or functions supported by the application. The first storage and retrieval apparatus can be configured to interface with the application executed on the user device if the user has authorized and/or opted-in to this function of the application and to identify the information associated with the one or more supplemental physical objects based on the scanned identifiers of the first set of physical objects.

In one embodiment, one or more the storage and retrieval apparatuses can be storage towers that include one or more receptacles defining one or more openings in the housing. A first of the one or more receptacles of a first storage tower can be configured to be aligned with a second of the one or more receptacles of a second storage tower. The second storage tower can be configured to transport, via a transport apparatus of the second storage tower, the one or more supplemental physical objects to the second receptacle of the second storage tower. The first storage tower can be configured to receive the one or more supplemental physical objects, via the first receptacle of the first storage tower aligned to the second receptacle of the second storage tower.

In one embodiment, an object storage and retrieval system can include storage and retrieval apparatus configured to store and dispense physical objects. The storage and retrieval apparatuses can have a housing and can include a storage area disposed within the housing, a controller, an input device, and an interactive display. A first storage and retrieval apparatus can be configured to identify one or more supplemental physical objects associated with the first set of physical objects, based on identities of a first set of physical object external to the first storage and retrieval apparatus, stored within the first storage and retrieval apparatus and generate an alert for a user to indicate that the one or more supplemental physical objects are available at the first storage and retrieval apparatus.

In one embodiment, an object storage and retrieval system can include a computing system and storage and retrieval apparatuses configured to store and dispense physical objects. Each of the storage and retrieval apparatuses can be in communication with the computing system and can have a storage area disposed within a housing, a processor, an input device, and an interactive display. The computing system can be configured to receive information associated with first set of physical objects disposed in a facility, identify one or more supplemental physical objects based on the information associated with the first set of physical objects, and transmit an alert to load the one or more supplemental physical objects in the first storage and retrieval apparatus in response to a failure to identify that the one or more supplemental physical objects are stored within the first storage and retrieval apparatus.

FIG. 1A is a schematic diagram of an exemplary storage and retrieval apparatus in the form of a storage tower 100 in accordance with an exemplary embodiment. The storage tower 100 can include housing having a base 102 coupled to side walls or surfaces extending from the base 102. In the present example, the side walls or surfaces of the storage tower 100 can form octagonal cylinder or column such that there are eight side walls or surfaces including a front face 104, a first side face 106, and a second side face 108. A front opening 110 can be disposed on the front face 104. A first side opening 118 can be disposed on the first side face 106. A second side opening can be disposed on the second side face 108. It can be appreciated that the openings, front opening 110, first side opening 118, and second side openings 114, can have retractable doors, windows, or panels to selective cover the openings 110, 114, and 118.

An interior of the storage tower 100 can include a transport apparatus 122 coupled to shafts or railings 123. The transport apparatus 122 can be configured to transport and support the tray 124, which is configured to support physical objects (e.g., the physical object 126). The transport apparatus 122 is further configured to move along the railings 123 along the y-axis. The interior of the storage tower 100 can further include a front storage receptacle 112 aligned with and/or coupled to the front opening 110. A first side storage receptacle 120 can be aligned with and/or coupled to the first side opening 118. A second side storage receptacle 116 can be aligned with and/or coupled to the second side openings 114. The front storage receptacle 112, first side storage receptacle 120, and second side storage receptacle 118 can each include a storage volume, configured to store objects, such as the tray 124 and the physical object 126. The front opening 110, first side opening 118 and second side openings 114 can provide access to the storage volume of the front storage receptacle 112, first side storage receptacle 120, and second side storage receptacle 118, respectively.

Figure 1B:
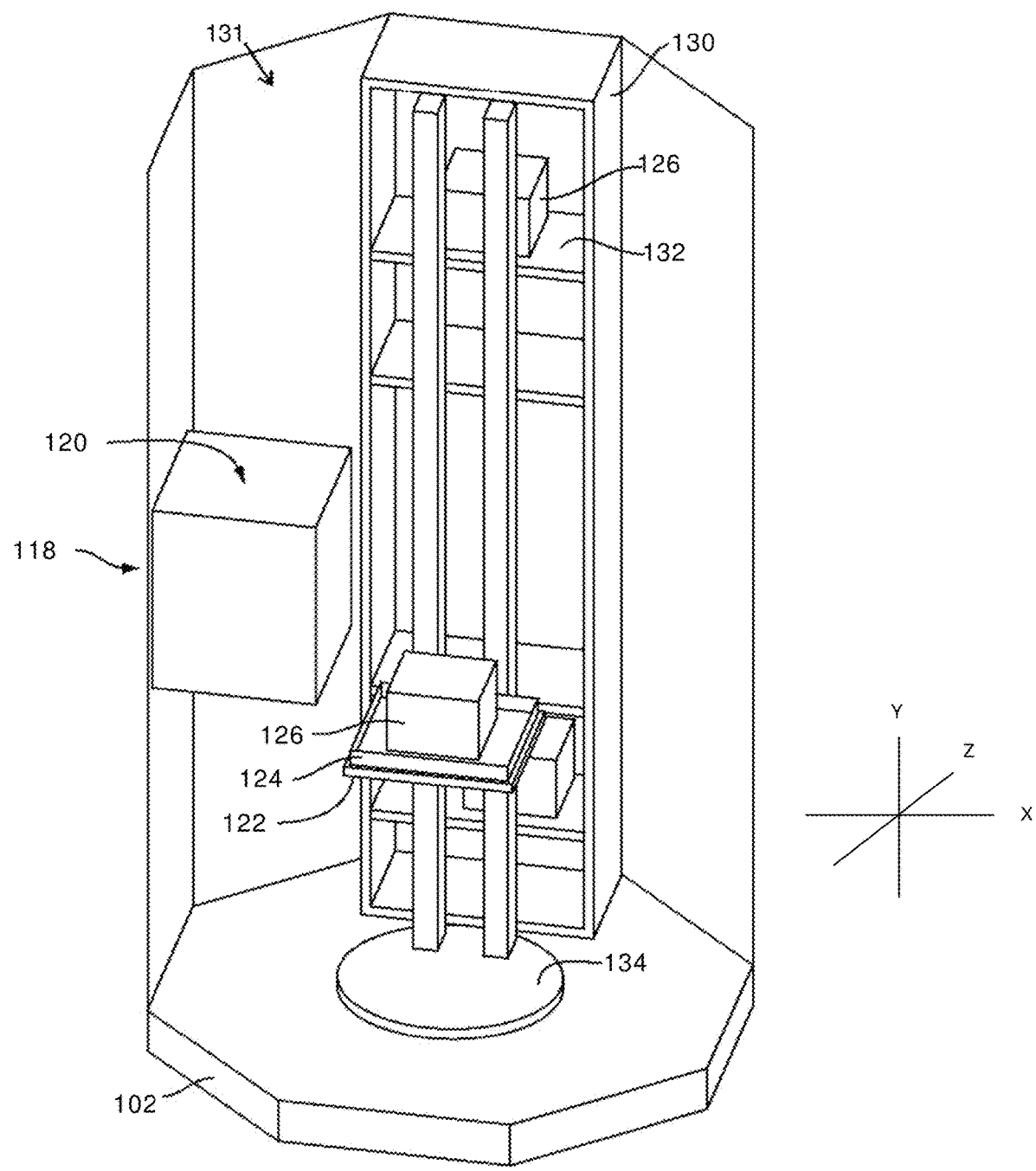
FIG. 1B is a schematic diagram of an interior of a storage and retrieval apparatus in accordance with an exemplary embodiment.

FIG. 1B is a schematic diagram of an interior of the storage tower 100 in accordance with an exemplary embodiment. The interior of the storage tower 100 can include eight interior walls 131 defined by the side walls or surfaces of the housing. The interior of the storage tower 100 can include a shelving unit 130, the transport apparatus 122, the railings 123, and a rotating base 134. The railings 123 can be coupled to the rotating base 134. The transport apparatus 122 can be configured to support and transport the tray 124 between a shelf on the shelving unit and one of the storage receptacles. The tray 124 can support the physical object 126. The transport apparatus 122 can be coupled to the railings 123. The transport apparatus 122 can extend perpendicularly from the railings 123. As an example, the transport apparatus 122 can be a pallet. The railings 123 can operate as a boom to lower and raise the transport apparatus 122. The rotating base 134 can rotate the railings 123, and therefore, the transport apparatus 122 360 degrees about a center axis of the rotating base.

The shelving unit 130 can include shelves 132 configured to store and support physical objects 126. The shelving unit 130 can be disposed along one or more of the interior walls 131 of the storage tower 100. For example, the shelving units 130 can be disposed along one interior wall, each interior wall or a subset of the interior walls of the storage tower 100.

As an example, the transport apparatus 122 can receive instructions to load a physical object 126 from the shelving unit 130, onto the transport apparatus 122, and load the physical object 126 into a first side receptacle 120. The rotating base 134 can be configured to rotate the railings 123 circumferentially around the interior of the storage tower 100 so that the railings 123 are parallel to the appropriate shelving unit 130. The transport apparatus 122 can vertically move up and down the railings 123 to align itself with the shelf 132 on which the requested physical object 126 is disposed.

The transport apparatus 122 can pick up the tray 124 supporting the physical object 126. The transport apparatus 122 can traverse along and rotate about the railings 123, transport and deposit the tray 124 and physical object 120 in the first side receptacle 120. The physical object 126 can be stored in the first side receptacle 120, until ejected from the first side opening 118.

Figure 2:
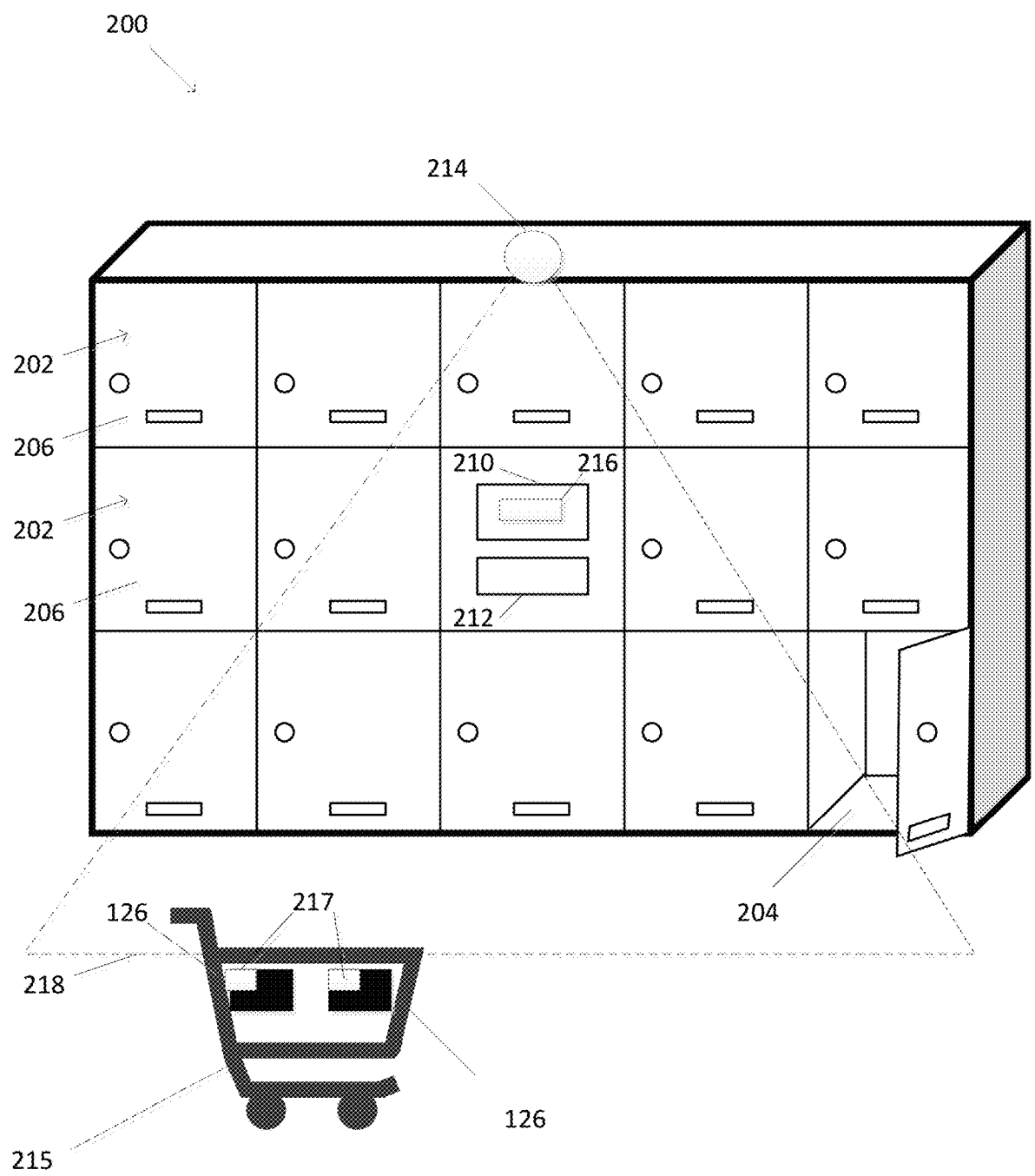
FIG. 2 is a schematic diagram of another exemplary storage and retrieval apparatus in accordance with an exemplary embodiment.

FIG. 2 is a schematic diagram of an exemplary storage and retrieval apparatus in the form of a storage locker apparatus 200 in accordance with an exemplary embodiment. The storage locker apparatus 200 can include housing having forming lockers 202. The lockers 202 can each include an interior storage area 204 that is selectively accessible via a door 206 that can be opened and closed and locked and unlocked. One or more physical objects or supplemental physical objects can be stored in the storage areas 204 of the lockers 202. The storage locker apparatus 200 can include an interactive display 210, an input device 212, a reader 214

The interactive display 210 can be disposed on the housing of storage locker apparatus 200. The interactive display 210 can be disposed on a front surface of the housing. The input device 212 can be disposed on housing of the storage locker apparatus 200 in proximity to the interactive display 210. For example, the input device 212 can be disposed on the front surface of the housing below the interactive display 210. The input device 212 can be one or more of an optical scanner, a keyboard/keypad, or an image capturing device.

The interactive display 210 can render a graphical user interface (GUI) 216. The GUI 216 can display information associated with a request for dispensing a physical object from one of the lockers 202 of the storage locker apparatus. As an example, a user can input information associated with a request for dispensing a physical object. The information can be an identifier, a name, a username, a pin number or any suitable information that can be used to identify the physical object to be retrieved or stored. As a non-limiting example, the user can enter the information, via a touchscreen display incorporated in the interactive display 210. Alternatively, or in addition to, the storage locker apparatus can have multiple input devices such as a keyboard, mouse, joystick, touchpad, or other devices configured to interact with the interactive display 210, such as the input device 212. The user can input identification information using the input device 212.

The user can also scan a machine-readable element encoded with an identifier associated with the physical object using the input device 212. As an example, the input device 212 can be an optical scanner or an image capturing device. The input device 212 can scan/capture and decode the identifier from the machine-readable element. The machine-readable element can be a barcode or a QR code. The input device 212 can transmit the identifier to the interactive display. The interactive display 210 can receive the information associated with the request and transmit the information to a computing system, an example of which is described in greater detail with respect to FIG. 7.

In one embodiment, the user can request to dispense a physical object disposed in the storage locker apparatus 200 or another storage and retrieval apparatus. The user can input identification information associated with the physical object using the interactive display 210 and/or input device 212. The identification information can be transmitted to the computing system. The computing system can instruct the storage locker apparatus 200 within which the physical object is disposed to dispense the physical object by unlocking a door to one of the lockers 202 so that the door opens. In the event the physical object is stored in a different storage and retrieval apparatus, the computing system can instruct the storage locker apparatus 200 to display a graphical user interface (GUI) rendering instructions on the interactive display 210 for retrieving the physical object from a different storage and retrieval apparatus or a different location. The instructions can include the location of the different storage and retrieval apparatus and/or a time frame in which the physical object may be available for retrieval.

In one embodiment, a reader 216 can detect a physical objects 126 passing by the storage locker apparatus 200 or approaching the storage locker apparatus 200, within a given field-of-view or radius 218. As an example, the physical objects 126 can be passing by in a cart 215. The reader 216 can be configured read and decode identifiers 217 disposed on physical objects.

In one embodiment, the identifiers 217 can be encoded in machine-readable elements on labels which are disposed on the physical objects 126. The machine-readable elements can be barcodes or QR codes. The reader 216 can be triggered by a motion sensor and can scan physical objects as the reader 216 detects motion within the given field-of-view or radius 219 and scans for identifiers. The reader 216 can transmit the identifiers to a computing system.

In one embodiment, the identifiers can be encoded in RFID tags. The reader 216 can be embodied as an RFID reader. The reader 216 can detect the RFID tags as the RFID tags pass by the storage locker apparatus 200. The reader 216 can scan and decode the identifiers from the RFID tags as the RFID pass through the given field-of-view or radius 218.

Figure 3A:
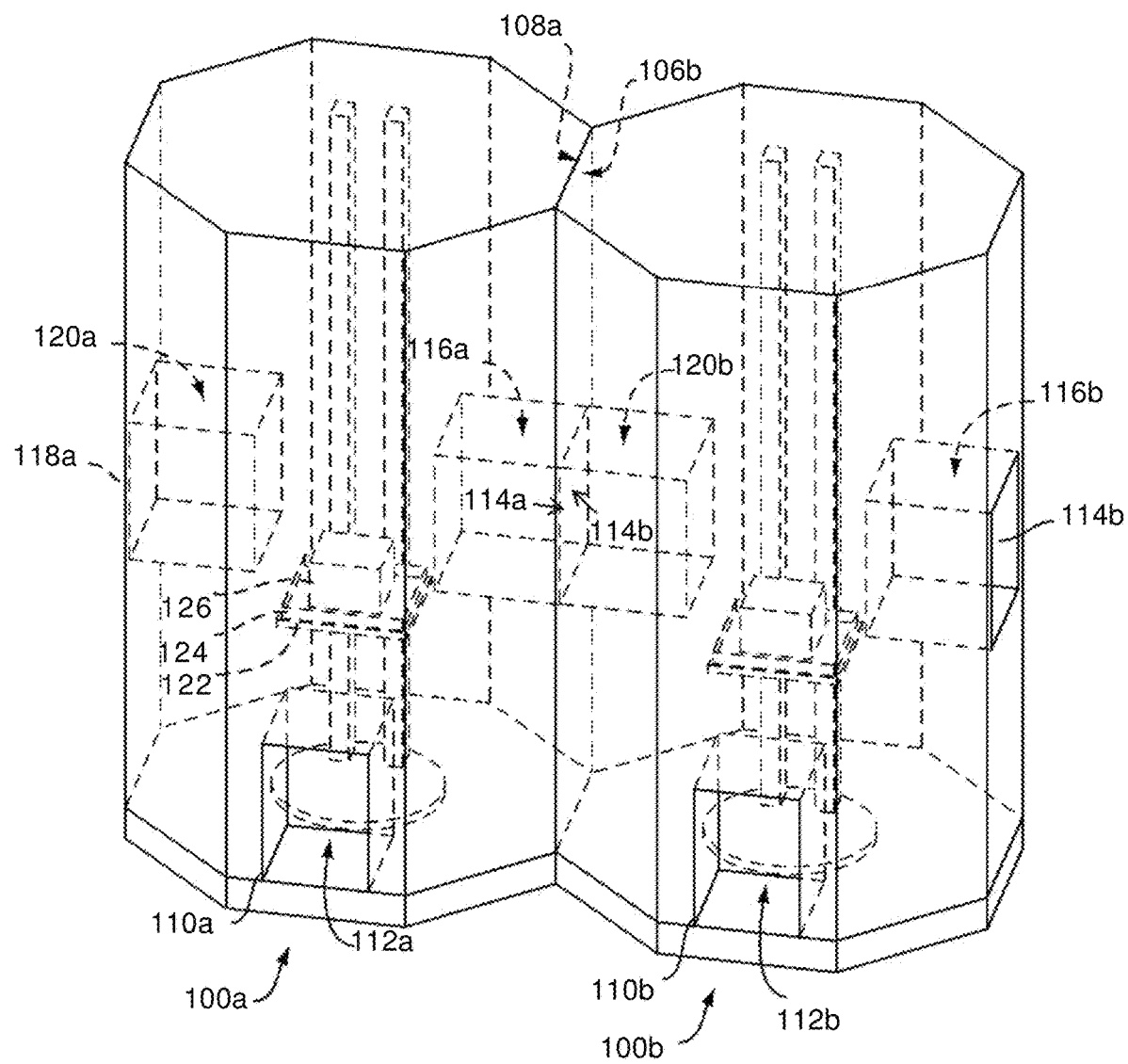
FIG. 3A is a schematic diagram of an arrangement of storage and retrieval apparatus in accordance with an exemplary embodiment.

FIG. 3A depicts an exemplary arrangement of storage and retrieval apparatuses in a storage and retrieval system. As a non-limiting example, the storage and retrieval apparatuses can be storage towers 100 *a* and 100 *b*. The storage tower 100 *a* can be disposed adjacent to the storage tower 100 *b*. The first side face 106 *a* of the storage tower 100 *a* can be aligned with, and adjacent to, the second side face 108 *b* of the storage tower 100 *b*. The second side opening 114 *b* disposed on the second side face 108 *b* of the storage tower 100 *b* can be aligned with, and adjacent to, the first side opening 118 *a* disposed on the first side face 106 *a* of the storage tower 100 *a*. The storage towers 100 *a* and 100 *b* can be directly adjacent to one another or can be spaced away from each other. Any number of storage towers can be disposed within a specified proximity of one another.

In one embodiment, the storage tower 100 *a* (or storage tower 100 *b*) can query its own records to confirm whether it is storing the physical object 126. In the event, the storage tower 100 *a* (or storage tower 100 *b*) confirms that it is storing the physical object 126, the transport apparatus 122, of storage tower 100 *a* (or storage tower 100 *b*), can transport the physical object 126 disposed on the tray 124, to the first side storage receptacle 120 *a*. The transport apparatus 122 can deposit the tray 124 supporting the physical object 126 the front storage receptacle 112 *a* (or storage tower 112 *b*). The tray 124 supporting the physical object 126 can be ejected from the front storage receptacle 112 *a* (or storage tower 112 *b*) through the front opening 110 *b* (or storage tower 110 *b*).

In the event, the storage tower 100 *a* (or storage tower 100 *b*) confirms that it is not storing the physical object, the storage tower 100 *a* (or storage tower 100 *b*) can transmit the request to the computing system. The computing system can instruct the storage tower 100 *a* (or storage tower 100 *b*) to display instructions to the user for retrieving the physical object 126 at a different storage tower. An example computing system is described in further detail with respect to FIGS. 7 and 8.

As an example, storage tower 100 *a* can confirm physical object 126 is not in storage tower 100 *a*. The storage tower 100 can transmit a request to storage tower 100 *b* for physical object 126 disposed in storage tower 100 *b*. The transport apparatus 122, of storage tower 100 *b*, can transport the physical object 126 disposed on the tray 124, to the second side storage receptacle 120 *b*. The transport apparatus 122, of storage tower 100 *b* can deposit the tray 124 supporting the physical object 126 in the first side storage receptacle 120 *b*, of the storage tower 100 *b*.

The tray 124 supporting the physical object 126 can be transferred from the first side storage receptacle 120 *b*, of the storage tower 100 *b*, through the first side opening 118 *b* of the storage tower 100 *b* through the second side opening 114 *a* into the storage volume of the second side storage receptacle 116 *a* of the storage tower 100 *a*. The tray 124 supporting the physical object 126 can be transferred from the second side storage receptacle 116 *a* to the transport apparatus 122, of the storage tower 100 *a*. The transport apparatus 122 can traverse up or down the railings 123 and deposit the tray 124 supporting the physical object 126, on the shelving unit of storage tower 100 *a*. An alert can be rendered on the graphical user interface of the display of storage tower 100 *a* indicating the physical object 126 is disposed in storage tower 100 *a*. The alert can also be transmitted from the storage tower 100 *a* to a user device or terminal.

Figure 3B:
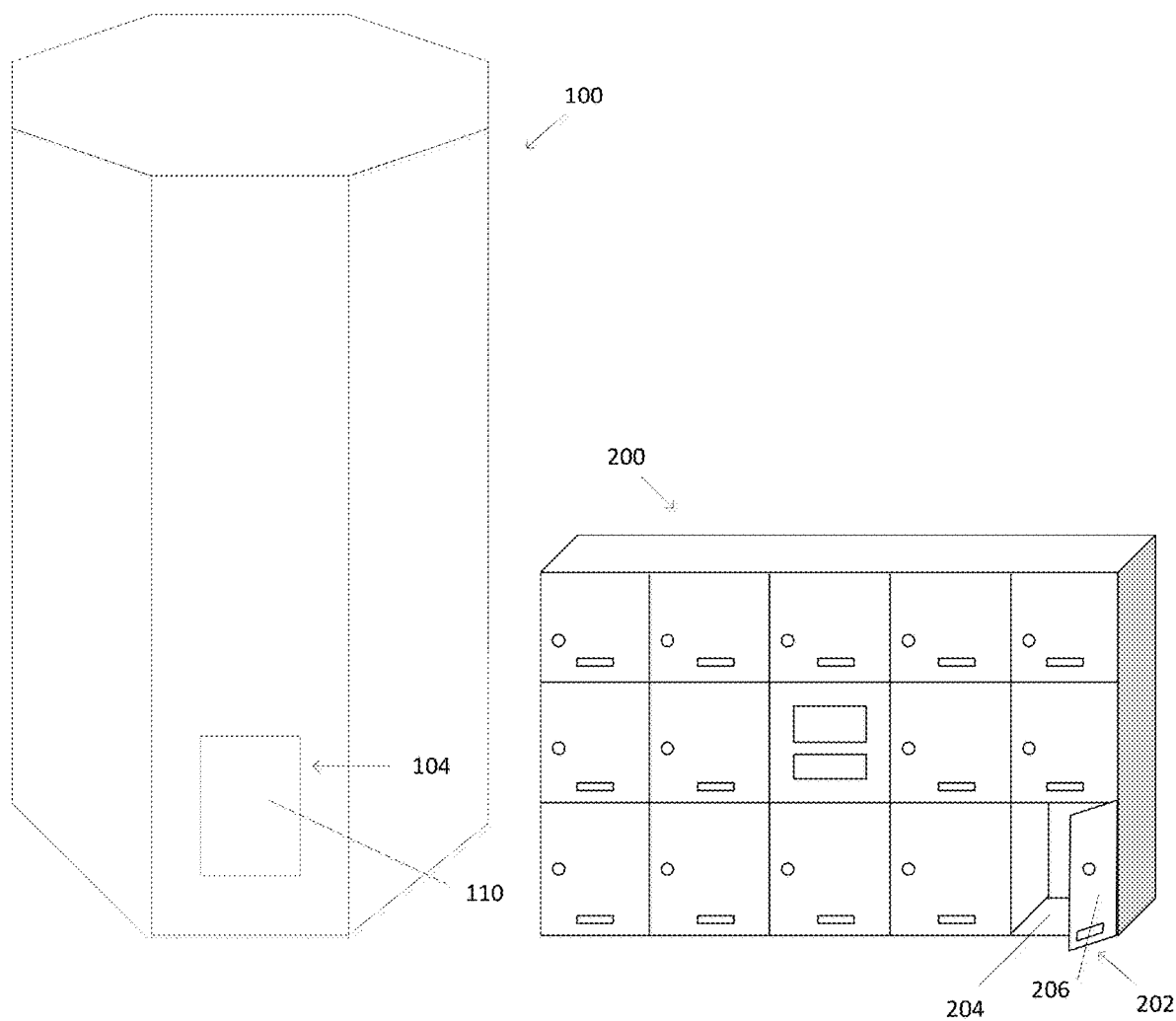
FIG. 3B is a schematic diagram of another arrangement of storage and retrieval apparatus in accordance with an exemplary embodiment.

FIG. 3B is a schematic diagram of another arrangement of storage and retrieval apparatuses in accordance with an exemplary embodiment. As a non-limiting example, the storage and retrieval apparatuses can include an embodiment of the storage tower 100 and an embodiment of the storage locker apparatus 200. In one embodiment, the storage tower 100 or storage locker apparatus 200 can query its own records to confirm whether it is storing a physical object in response to a request, in response to scanning/reading an identifier in the user's cart, or in response to receiving an identifier from an application executing of the user's mobile device. In the event the storage tower 100 receives the request or identifier from the user and confirms that it is storing the physical object, the transport apparatus of storage tower 100 can transport the physical object from its storage location in the storage tower to the receptacle at the front opening 110 of the front face 104 to dispense the physical object. In the event the storage locker apparatus 200 receives the request or identifier from the user and confirms that it is storing the physical object, the storage locker apparatus 200 can unlock the door 206 of the locker 202 within which the physical object is stored to permit access to the physical object in the storage area 204 of the locker 202 to dispense the physical object.

In the event, the storage tower 100 receives the request or identifier and confirms that it is not storing the physical object, the storage tower 100 can transmit the request or identifier to the computing system. The computing system can instruct the storage tower 100 to display instructions to the user for retrieving the physical object at a different storage and retrieval apparatus. For example, the computing system can determine that the storage locker apparatus 200 is storing the physical object, and can instruct the storage tower 100 to display instructions to the user for retrieving the physical object from the storage locker apparatus 200.

In the event, the storage locker apparatus 200 receives the request or identifier and confirms that it is not storing the physical object, the storage locker apparatus 200 can transmit the request to the computing system. The computing system can instruct the storage locker apparatus 200 to display instructions to the user for retrieving the physical object at a different storage and retrieval apparatus. For example, the computing system can determine that the storage tower 100 is storing the physical object, and can instruct the storage locker apparatus 200 to display instructions to the user for retrieving the physical object from the storage tower 100. An example computing system is described in further detail with respect to FIGS. 7 and 8.

Figure 3C:
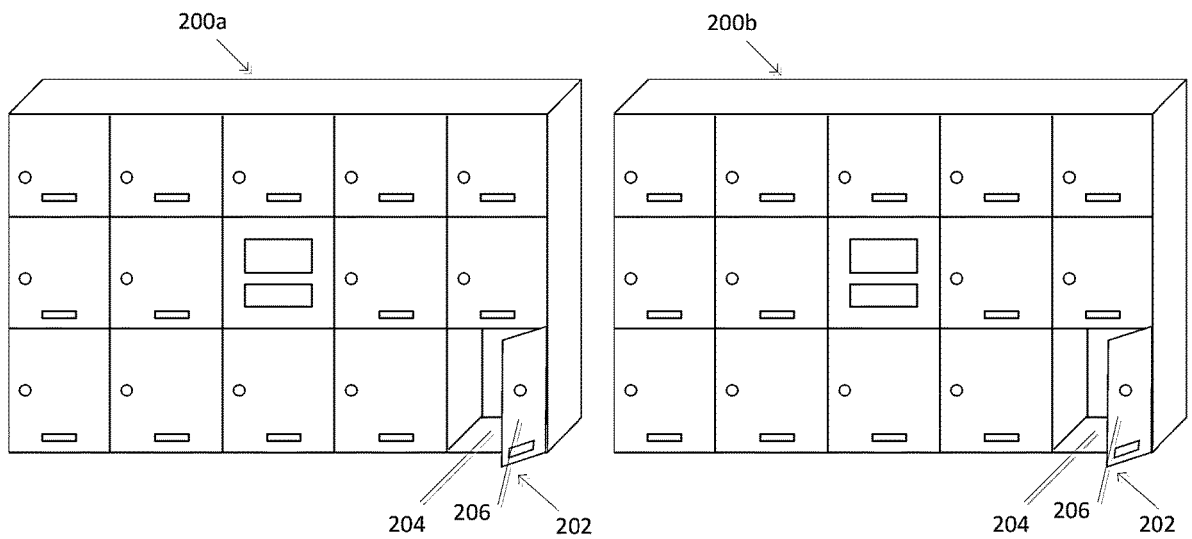
FIG. 3C is a schematic diagram of yet another arrangement of storage and retrieval apparatus in accordance with an exemplary embodiment.

FIG. 3C is a schematic diagram of yet another arrangement of storage and retrieval apparatuses in accordance with an exemplary embodiment. As a non-limiting example, the storage and retrieval apparatuses can include two or more of the storage locker apparatus 200 (e.g., storage locker apparatus 200 *a* and storage locker apparatus 200 *b*). In one embodiment, the storage locker apparatus 200 *a* can query its own records to confirm whether it is storing a physical object in response to a request from the user, in response to scanning/reading an identifier in the user's cart, or in response to receiving an identifier from an application executing of the user's mobile device. In the event the storage locker apparatus 200 *a* receives the request or identifier and confirms that it is storing the physical object, the storage locker apparatus 200 *a* can unlock a door 206 of the locker 202 of the storage locker apparatus 200 *a* within which the physical object 126 is stored to permit access to the physical object in the storage area 204 of the locker 202 to dispense the physical object.

In the event, the storage locker apparatus 200 *a* confirms that it is not storing the physical object, the storage locker 200 *a* can transmit the request or identifier to the computing system. The computing system can instruct the storage locker 200 *a* to display instructions to the user for retrieving the physical object 126 at a different storage and retrieval apparatus. For example, the computing system can determine that the storage locker apparatus 200 *b* is storing the physical object 126, and can instruct the storage locker apparatus 200 *a* to display instructions to the user for retrieving the physical object 126 from the storage locker apparatus 200 *b*. An example computing system is described in further detail with respect to FIGS. 7 and 8.

Figure 4:
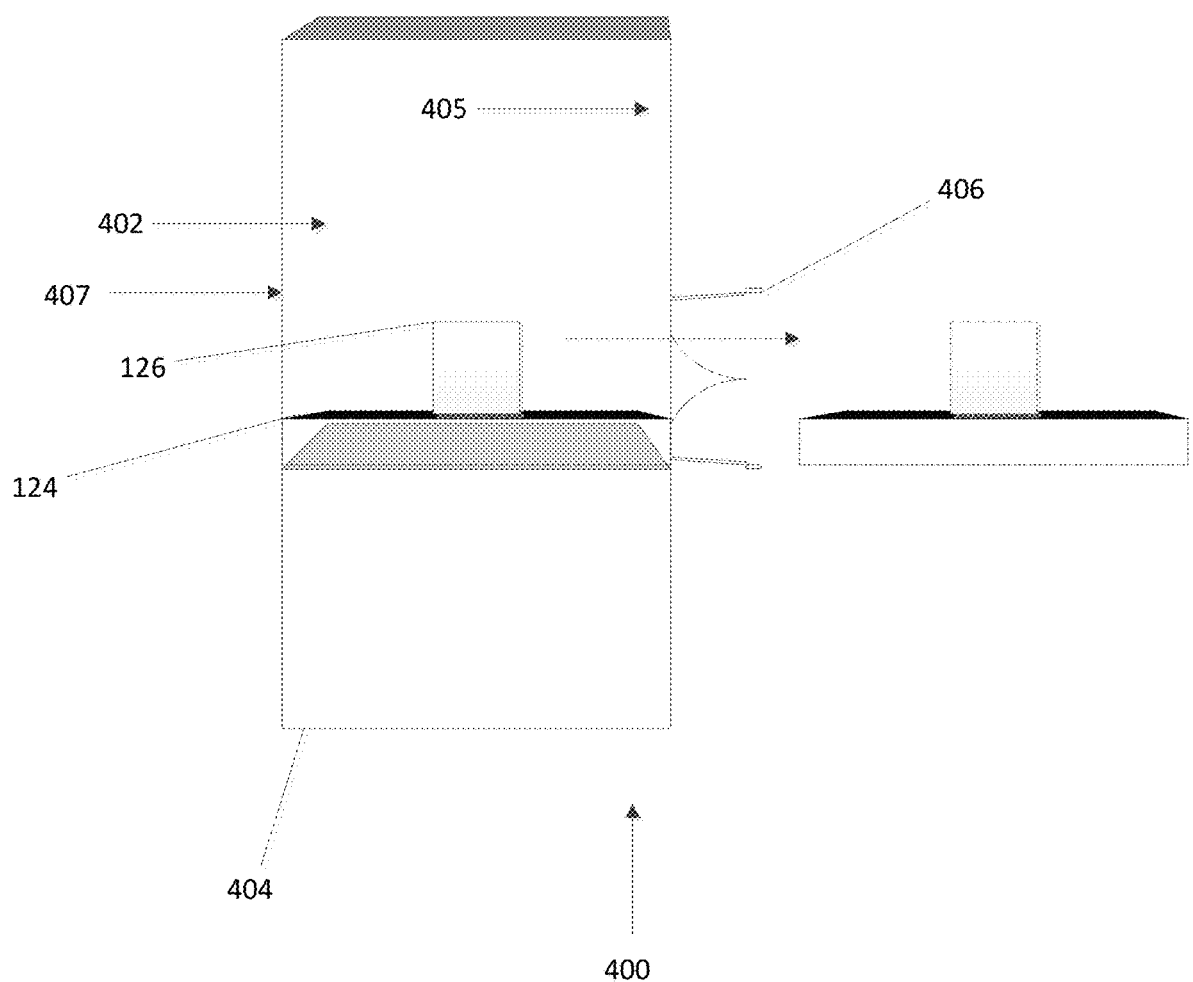
FIG. 4 is a schematic diagram of a storage receptacle in an storage tower in accordance with exemplary embodiments.

FIG. 4 is a schematic diagram of a storage receptacle 400 in an embodiment of the storage tower 100 in accordance with exemplary embodiments. One or more storage receptacles 400 can be disposed in the storage tower at different locations as described herein. For example, the storage receptacle 400 can be disposed in a front, a first side, or a second side of the storage tower. The storage receptacle 400 can include an interior storage volume 402 and a base 404 within the interior storage volume 402. The base 404 can support a tray 124, which can support a physical object 126. A first (front) side 405 of the storage receptacle 400 can include a door 406. A second (back) side 407 of the storage receptacle 400 can be an open face. The storage receptacle 100 can be configured to receive and eject the tray 124 and physical object 126 from the door 106 on the front side and through the open face of the back side 107. The door 406 can be a sliding door (sliding horizontally or vertically), a rotating door, a hinged door, and/or a double door.

Figure 5:
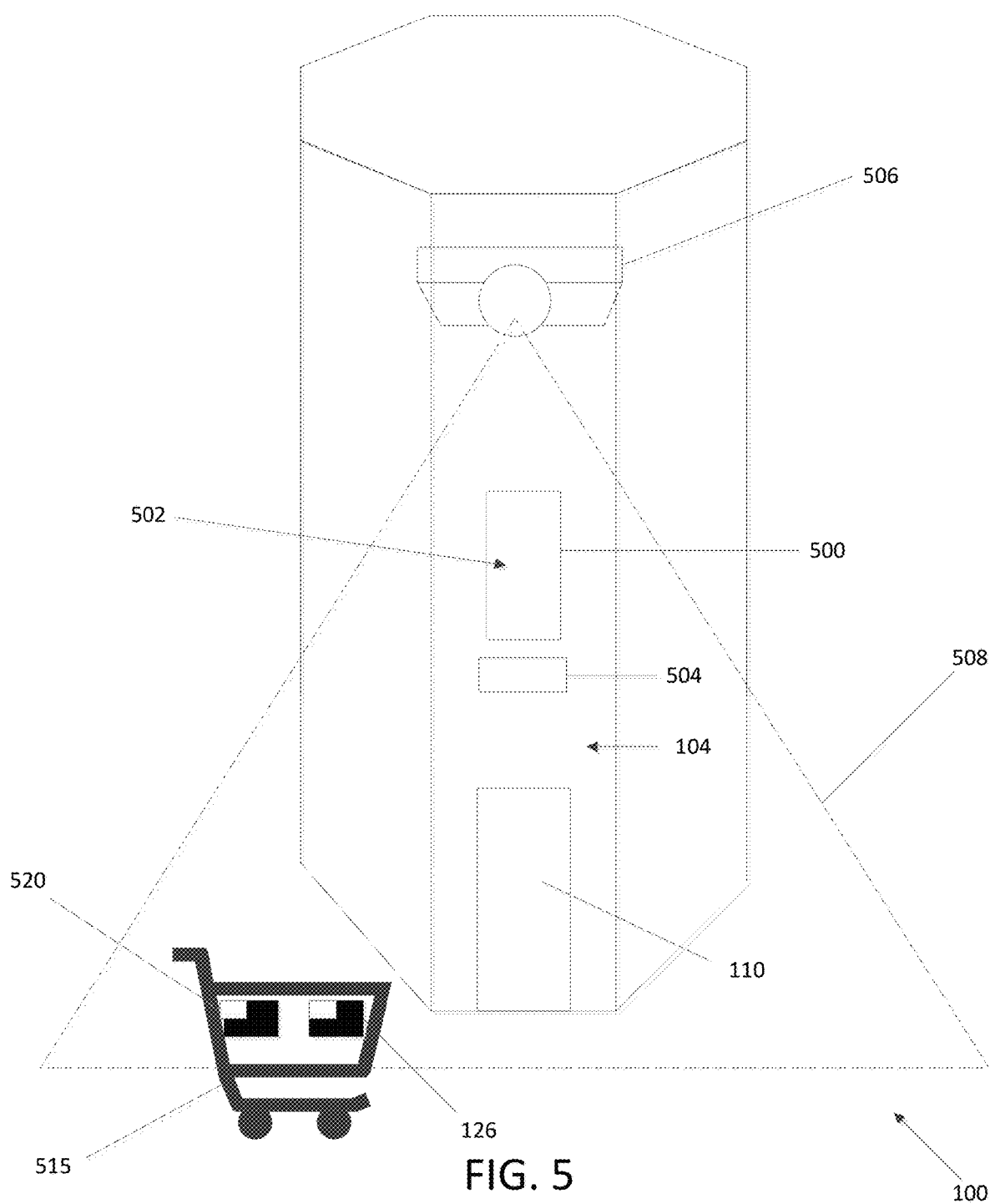
FIG. 5 is a schematic diagram of an exterior of an embodiment of the storage and retrieval apparatus of FIG. 1A in accordance with an exemplary embodiment.

FIG. 5 is a schematic diagram of an exterior of an embodiment of the storage tower 100 in accordance with an exemplary embodiment. An interactive display 500 can be disposed on the storage tower 100. The interactive display 500 can be disposed on the front surface 104 with respect to the front opening. An input device 504 can also be disposed on the storage tower. The input device 504 can be disposed on the front surface 104 with respect to the front opening 110. The input device 504 can be one or more of, an optical scanner, a keyboard/keypad, and image capturing device.

The interactive display 500 can render a graphical user interface (GUI) 502. The GUI 502 can display information associated with a request for dispensing a physical object through the front opening of the storage tower. As an example, a user can input information associated with a request for dispensing a physical object. The information can be an identifier, a name, a username, a pin number or any suitable information that can be used to identify the physical object to be retrieved or stored. As a non-limiting example, the user can enter the information, via a touchscreen display incorporated in the interactive display 502. Alternatively, or in addition to, the interactive display 502 can have multiple input devices such as a keyboard, mouse, joystick, touchpad, or other devices configured to interact with the interactive display 502, such as the input device 504. The user can input identification information using the input device 504

The user can also scan a machine-readable element encoded with an identifier associated with the physical object, using the input device 504. As an example, the input device 504 can be an optical scanner or an image capturing device. The input device 504 can scan/capture and decode the identifier from the machine-readable element. The machine-readable element can be a barcode or a QR code. The input device 504 can transmit the identifier to the interactive display. The interactive display 500 can receive the information associated with the request and transmit the information to a computing system, an example of which is described in greater detail with respect to FIG. 7.

In one embodiment, the user can request to dispense a physical object disposed in the storage tower 100 or another storage tower. The user can input identification information associated with the using the interactive display 500 and/or input device 504. The identification information can be transmitted to the computing system. The computing system can instruct the storage tower 100 within which the physical object is disposed to dispense the physical object. In the event the physical object is disposed in the storage tower 100, the storage tower 100 can dispense the physical object through the front opening 110 of the storage tower 100. In the event the physical object is stored in a different storage tower, the computing system can instruct the storage tower 100 to display a graphical user interface (GUI) rendering instructions on the interactive display 502 for retrieving the physical object from a different tower or location. The instructions can include the location of the different tower and/or a time frame in which the physical object may be available for retrieval.

In one embodiment, a reader 506 can be disposed on the front surface 104 of the storage tower 100. The reader 506 can detect a physical objects 126 passing by the storage tower 100 or approaching the storage tower 100, within a given field-of-view or radius 508. As an example, the physical objects 126 can be passing by in a cart 515. The reader 506 can be configured read and decode identifiers 520 disposed on physical objects.

In one embodiment, the identifiers 520 can be encoded in machine-readable elements on labels which are disposed on the physical objects 126. The machine-readable elements can be barcodes or QR codes. The reader 506 can be triggered by a motion sensor and can scan physical objects as the reader 506 detects motion within the given field-of-view or radius 508 and scans for identifiers 520. The reader 508 can transmit the identifiers to a computing system.

In one embodiment, the identifiers 520 can be encoded in RFID tags. The reader 506 can be embodied as an RFID reader. The reader 506 can detect the RFID tags as the RFID tags pass by the storage tower 100. The reader 506 can scan and decode the identifiers 520 from the RFID tags as the RFID pass through the given field-of-view or radius 508.

Figure 6:
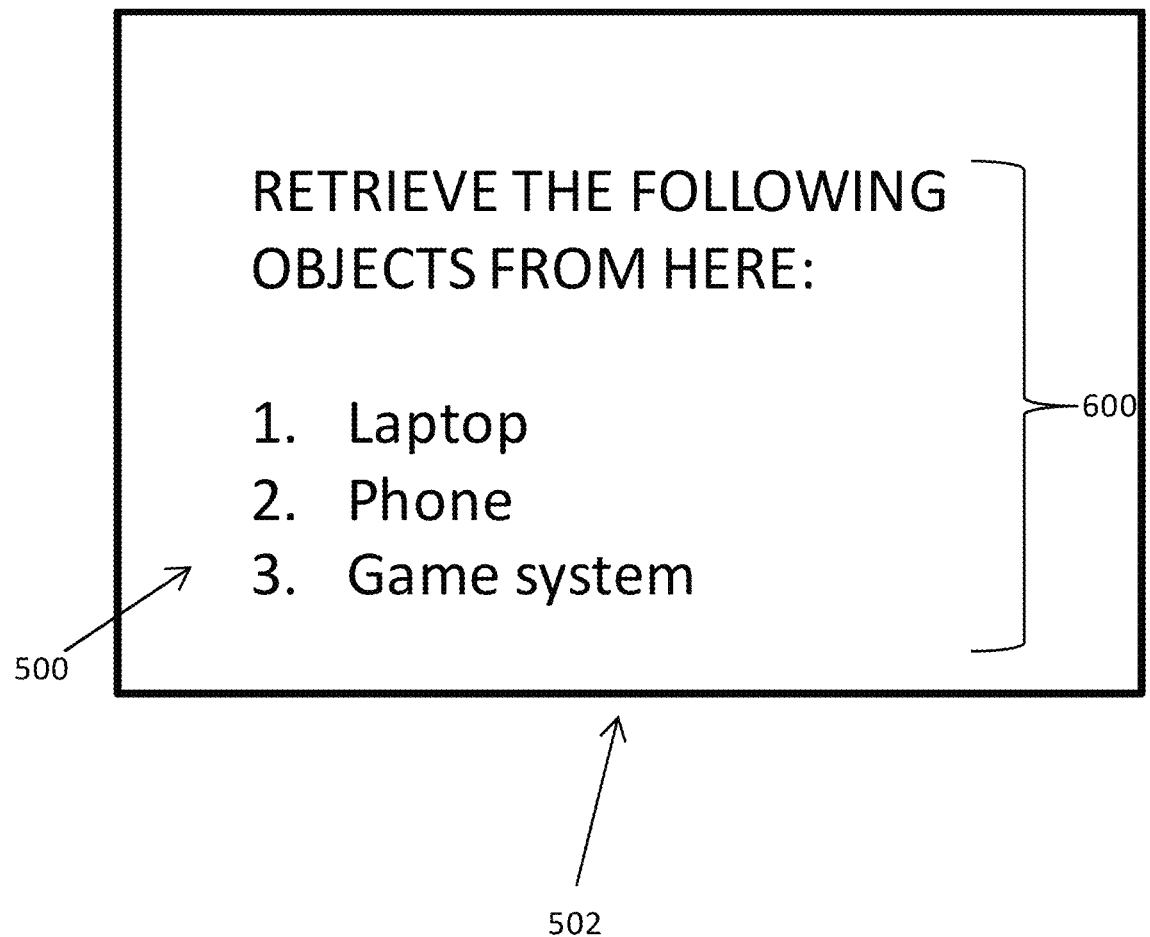
FIG. 6 is an exemplary graphical user interfaces (GUI) in accordance with an exemplary embodiment.

FIG. 6 illustrates an exemplary graphical user interface (GUI) to be rendered on a display of a storage and retrieval apparatus (e.g., on the display 210 of the storage locker apparatus 210 or on the display 500 of the storage tower 100). The GUI 502 of the display 500 can render an alert 600. The alert 600 can indicate physical objects available at the storage and retrieval apparatus. The alert 600 can include information associated with the physical object available at the storage and retrieval apparatus.

Figure 7:
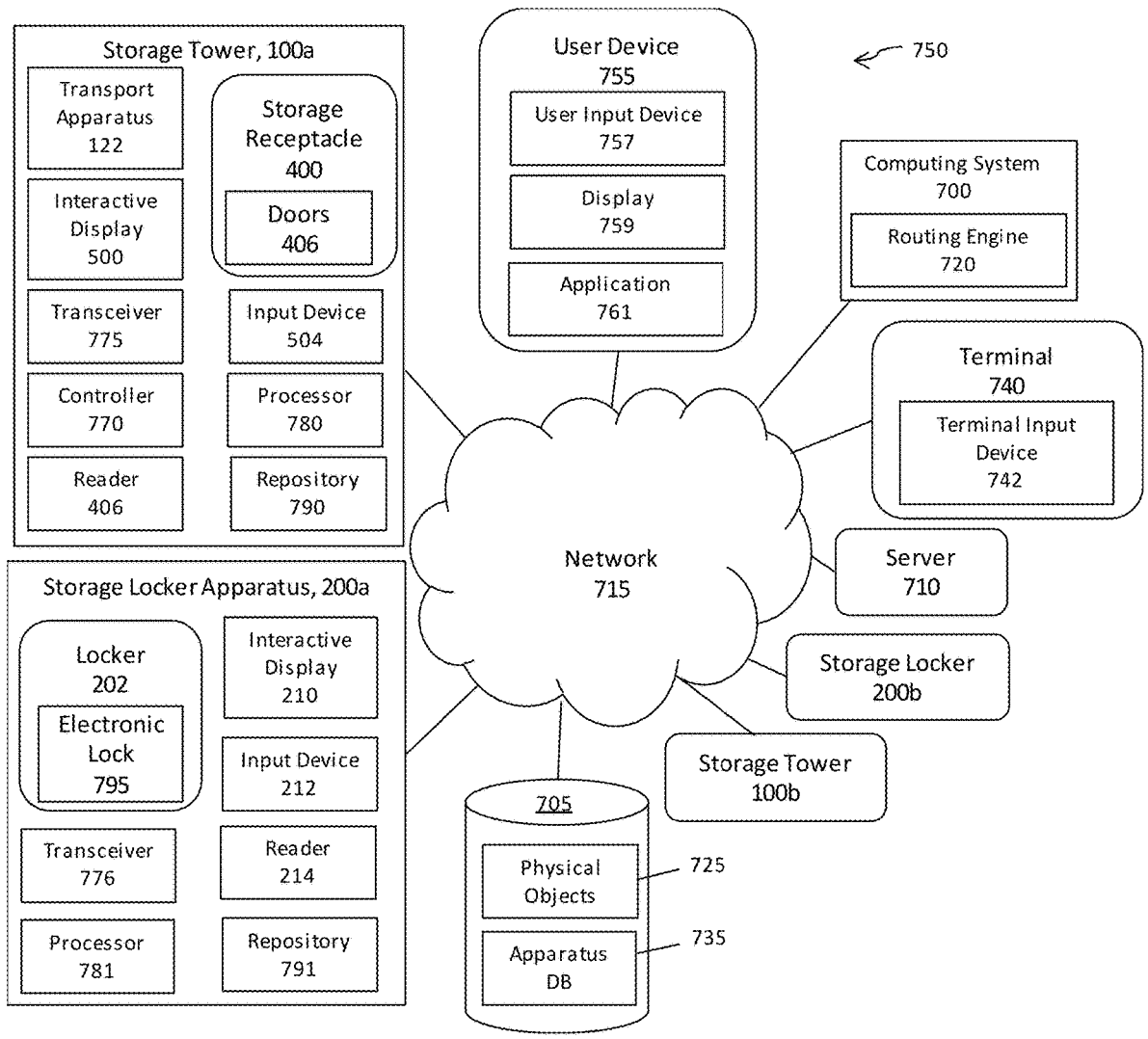
FIG. 7 is a block diagram illustrating an autonomous object storage and retrieval system in accordance with an exemplary embodiment.

FIG. 7 illustrates an exemplary autonomous object storage and retrieval system 750 in accordance with an exemplary embodiment. The autonomous object storage and retrieval system 750 can include one or more databases 705, one or more servers 710, one or more computing systems 700, storage towers 100 *a-b*, storage locker apparatuses 200 *a-b*, one or more user devices 755, and one or more terminals 740. The routing engine 720 can implement the autonomous object storage and retrieval system 750.

In an example embodiment, one or more portions of the communications network 715 can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 710 includes one or more computers or processors configured to communicate with the computing system 700, the databases 705, storage and retrieval apparatuses (e.g., storage towers 100 *a-b*, the storage locker apparatus 200 *a-b*), terminals 740 and user devices 755 via a communications network 715. The server 710 hosts one or more applications configured to interact with one or more components computing system 700 and/or facilitates access to the content of the databases 705. The databases 705 may store information/data, as described herein. For example, the databases 705 can include physical objects database 725 and a storage and retrieval apparatus database 735. The physical objects database 725 can store information associated with physical objects. The storage and retrieval apparatus database 735 can store information associated with the storage and retrieval apparatus locations and physical object disposed in the storage and retrieval apparatuses. The databases 705 can be located at one or more geographically distributed locations from the computing system 700. Alternatively, the databases 705 can be located at the same geographically as the computing system 700.

The storage towers 100 *a-b* can each include one or more of the storage receptacles 400, the transport apparatus 122, the tray 124, the interactive display 500, the input device 504, the controller 770, the transceiver 775, processor 780, and a repository 790. The one or more storage receptacles 400 can each include a door 406. The transceiver 775 can transmit and receive data via the network 715, and/or can transmit data directly to and receive data directly from the computing system 700, the terminal 740, the server 710, and/or the user device 755. The controller 770 can control the operations of transport apparatus 122, door 406, interactive display 500, and input device 504, based on received data from the input device 504, the reader 506, and/or the transceiver 775. The processor 780 can process information received via the input device 504, the reader 506, and/or the transceiver 775 and can execute queries on the repository 790. The repository 790 can store information associated with physical objects stored in the respective storage tower 100*a* or 100*b*.

The storage locker apparatuses 200 *a-b* can each include one or more of the lockers have storage areas that can be selectively accessible via doors. The lockers 202 can include electronic locks 795. The storage locker apparatuses 200 a-b can also include the interactive display 210, the input device 212, a reader 214, a transceiver 776, processor 781, and a repository 791. The transceiver 776 can transmit and receive data via the network 715, and/or can transmit data directly to and receive data directly from directly the computing system 700, the terminal 740, the server 710, and/or the user device 755. The processor 781 can control the operation of locks, the interactive display 210, the input device 212, and the reader 214 based on received data from the input device 210, the reader 214, and/or the transceiver 776. The processor 781 can process information received via the input device 212, the reader 214, and/or the transceiver 776 and can execute queries on the repository 791. The repository 791 can store information associated with physical objects stored in the respective storage locker apparatus 200 a or 200 b.

In one embodiment, terminals 740 and storage and retrieval apparatuses (e.g., storage towers 100 a-b, storage and retrieval apparatuses 200 a-b) can be disposed throughout a facility. The terminals 740 can include a terminal input device 742. The terminal input device 742 can be a scanner, keyboard device, multi-touchscreen, or any other type of input device. The terminal input device 742 can receive input associated with a first set of physical objects. For example, the terminal input device 742 can include an optical scanner. The terminal input device 742 can scan machine-readable elements disposed on each of the first set of physical objects. Each of the machine-readable elements can be encoded with an identifier associated with the physical object. The terminal 740 can transmit the received input associated with the first set of physical objects to the computing system 700.

The computing system 700 can execute the routing engine 720 in response to receiving the input from the terminal 740. The routing engine 720 can query the physical objects database 725 to retrieve information associated with the first set of physical objects using the received input associated with the first set of physical objects. The routing engine 720 can identify supplemental physical objects related to the first set of physical objects based on the retrieved information. The routine engine 720 can query the apparatus database 735 to determine the location of the supplemental physical objects. The routing engine 720 can transmit the information associated with the supplemental physical objects including the location of the physical objects to the terminal 740.

The terminal 740 can receive the information associated with the supplemental physical objects and transmit the information to the appropriate storage and retrieval apparatus (e.g., storage tower 100 a or 100 b or storage locker apparatuses 200 a or 200 b). In one embodiment the terminal 740 or the routing engine 720 can identify which storage and retrieval apparatus to transmit information associated with the supplemental physical based on attributes associated with the storage and retrieval apparatus. The attributes can include which storage and retrieval apparatus stores a majority of the supplemental physical objects, which storage and retrieval apparatus is closest in proximity to the terminal 100, or which storage and retrieval apparatus is closest to a location a user may pass by (i.e., entrance and/or exit of the facility).

In response to the storage and retrieval apparatus receiving the information associated with the supplemental physical objects, via the transceiver 775, the processor 780 of the storage and retrieval apparatus can identify the physical objects of the supplemental physical objects stored within the storage and retrieval apparatus, by querying the repository 790. The storage tower 100 a or 100 b can identify one or more physical objects of the supplemental physical objects that are not stored within it based on the query of the repository, but are rather stored in a different one of the storage and retrieval apparatus. The storage and retrieval apparatus can transmit a request, via the transceiver 775, to another storage and retrieval apparatus for the one or more physical objects not stored within it, to be transferred to the storage and retrieval apparatus.

As an example, the storage tower 100 a can receive information associated with the supplemental physical objects. The storage tower 100 a can determine one or more physical objects of the supplemental physical objects not stored in the storage tower 100 a. The storage tower 100 a can determine the one or more physical objects are stored in the storage tower 100 b. In one embodiment, the storage tower 100 a can determine the one or more physical objects are stored in storage tower 100 b, based on the received information associated with the supplemental physical objects. The storage tower 100 a can transmit a request to the storage tower 100 b for the one or more physical objects to be transferred to the storage tower 100 a. In one embodiment, a storage receptacle 400 (e.g., first side storage receptacle) of the storage tower 100 a is configured to be aligned with a storage receptacle 400 (e.g., second side storage receptacle) of the second storage tower.

The storage tower 100 b can receive the request for the one or more physical objects. The controller 770 of storage tower 100 b can control the transport apparatus 122 of storage tower 100 b, to pick-up the one or more physical objects stored in the shelving unit of the storage tower 100 b, transport the one or more physical objects, and deposit the one or more physical objects in the storage receptacle of the storage tower 100 b aligned with the storage receptacle 400 of storage tower 100 a. The storage tower 100 a can receive the one or more physical objects in the storage receptacle 400. The controller 770 of storage tower 100 a can control transport apparatus 122 of storage tower 100 a, to pick-up the one or more physical objects, transport the one or more physical objects, and deposit the one or more physical objects on the shelving unit of the storage tower 100 a.

Upon receiving the one or more physical objects, the controller 770 of storage tower 100 a can generate and transmit an alert. In one embodiment, the alert can include information associated with the supplemental physical objects. The controller 770 can render the alert on the display 500 and/or transmit the alert to be rendered on a display 759 of a user device 755. The user device 755 can be associated with a user at the terminal 740 receiving input associated with the first set of physical objects. In one embodiment, the user device 755 can execute an application 761. After a user authorizes and/or opts in to the function of the application, the storage tower 100 a can interface with the application 761 to transmit the alert.

In embodiment, a reader 506 can be disposed on the storage tower 100 a or 100 b. The reader 506 can read one or more machine-readable elements or one or more radiofrequency identifier (RFID) tags disposed on the first set of physical objects, as a cart (e.g., cart 515 as shown in FIG. 5) including the first set of physical objects traverses past the storage tower 100 a and/or 100 b. The storage tower 100 a or 100 b can transmit the one or more identifiers encoded in the machine readable elements or RFID tags disposed on the physical objects, decoded by the reader 506, to the computing system 700.

The routing engine 720 can query the physical objects database 725 to retrieve information associated with the first set of physical objects using the received input associated with the first set of physical objects. The routing engine 720 can identify supplemental physical objects related to the first set of physical objects based on the retrieved information. The routine engine 720 can query the apparatus database 735 to determine the location of the supplemental physical objects. The routing engine 720 can transmit the information associated with the supplemental physical objects including the location of the supplemental physical objects to the storage and retrieval apparatus, which transmitted the identifiers of the first set of physical objects to the computing system 700.

In response to the storage and retrieval apparatus receiving the information associated with the supplemental physical objects, via the transceiver (e.g., transceiver 775, 776), the processor (e.g., processor 780, 781) of the storage and retrieval apparatus can identify the physical objects of the supplemental physical objects stored within the storage and retrieval apparatus, by querying the repository (e.g., repository 790, 791). The storage and retrieval apparatus can identify one or more physical objects of the supplemental physical objects that are not stored in within it based on the query of the repository, but rather are stored in a different one of the storage and retrieval apparatuses. The storage and retrieval apparatus can transmit a request, via the transceiver, to another storage and retrieval apparatus for the one or more physical objects not stored within it to verify the other storage and retrieval apparatus has the one or more physical objects. In some embodiments, the one or more physical objects can be autonomously transferred from the other storage and retrieval apparatus to the storage and retrieval apparatus or the storage and retrieval apparatus can display instructions to a user for retrieving the one or more physical objects from the other storage and retrieval apparatus. For embodiments in which the storage and retrieval apparatus receives the one or more physical objects from the other storage and retrieval apparatus, the storage and retrieval apparatus can generate and transmit an alert, as described herein.

In an embodiment, the user device 755 can execute an application 761 associated with the facility. For example, a user of the user device can install the application 761 on the user device and authorize and/or opt-in to functionality of the application. In response to executing the application 761 after the user authorizes and/or opts in to the application 761, the user device 755 can receive input associated with the first set of physical objects, via the user input device 757. The user input device 757 can be an optical scanner, keyboard, multi-touchscreen, or any other type of input device. The input can be identifiers associated with each of the first set of physical objects. The a user can opt-in to a service via the application 761 to transmit information associated with the received input to the computing system 700, via the application 761. The user device 755 can transmit the input associated with the first set of physical objects as well as a location of the user device 755, to the computing system 700.

The routing engine 720 can query the physical objects database 725 to retrieve information associated with the first set of physical objects using the received input associated with the first set of physical objects. The routing engine 720 can identify supplemental physical objects related to the first set of physical objects based on the retrieved information. The routine engine 720 can query the towers database 735 to determine the location of the supplemental physical objects. The routing engine 720 can transmit the information associated with the supplemental physical objects including the location of the supplemental physical objects to a storage and retrieval apparatus based on attributes associated with the storage and retrieval apparatus. The attributes can include which storage and retrieval apparatus stores a majority of the supplemental physical objects, which storage and retrieval apparatus is closest in proximity to the terminal 100, or which storage and retrieval apparatus is closest to a location a user may pass by (i.e., entrance and/or exit of the facility).

In response to the storage and retrieval apparatus receiving the information associated with the supplemental physical objects, via the transceiver, the processor of the storage and retrieval apparatus can identify the physical objects of the supplemental physical objects stored within the storage and retrieval apparatus, by querying the repository. The storage and retrieval apparatus can identify one or more physical objects of the supplemental physical objects, not stored in within it based on the query of the repository, and rather stored in a different storage and retrieval apparatus. The storage and retrieval apparatus can display instructions for retrieving the supplemental physical objects from the other storage and retrieval apparatus and/or can transmit a request, via the transceiver, to another storage and retrieval apparatus for the one or more physical objects not stored within it, to be transferred to the storage and retrieval apparatus, as described herein.

The user associated with the user device 755 can interface with the storage and retrieval apparatus which has transmitted/rendered the alert. The user can interface with the display (e.g., display 210, 500) and/or the input device (e.g., input device 212, 504) of the storage and retrieval apparatus to select one or more physical objects of the supplemental physical objects for retrieval. For embodiments in which the storage and retrieval apparatus is the storage tower 100 *a* or 100 *b*, the controller 770 can control the transport apparatus 122 of the storage tower 100 *a* or 100 *b* to pick-up, transport, and deposit the one or more physical objects in a storage receptacle 400 aligned/coupled with the front opening of the storage tower 100 *a* or 100 *b*. The storage tower 100 *a* or 100 *b* can dispense the one or more physical objects through the front opening. For embodiments in which the storage and retrieval apparatus is the storage locker apparatus 200 *a* or 200 *b*, the processor 781 can control the electronic lock(s) on the locker(s) within which the one or more physical objects are stored to open the locker(s).

As a non-limiting example, the autonomous object storage and retrieval system 750 can be implemented in a retail store environment. The storage and retrieval apparatuses can be disposed in a retail store. The terminals 740 can be embodied as Point of Sale (POS) terminals, disposed in the retail store. The user can be customers shopping in the retail store. The customers can scan products to be purchased using the user device 755 while the application 761 is executed on the user device 755. Alternatively, or in addition to, the customers can scan products to be purchased at the POS terminals. Additionally, the customers can load carts or baskets with physical objects as the customers shop in the retail store.

In one embodiment, a customer can input information associated with products to be purchased at a POS terminal (as described above with respect to terminal 740). The POS terminal can transmit the received input associated with the products to be purchased to the computing system 700. The routing engine 720 can query the physical objects database 725 to retrieve information associated with the products to be purchased using the received input associated with the products to be purchased. The routing engine 720 can identify supplemental products related to the products to be purchased based on the retrieved information. For example, the routing engine 720 can identify that a customer is purchasing a gaming system. The routing engine 720 can identify supplemental products such as games for the gaming system. The routine engine 720 can query the apparatus database 735 to determine the location of the supplemental products. The routing engine 720 can transmit the information associated with the supplemental products including the location of the supplemental products to the POS terminal.

The POS terminal can receive the information associated with the supplemental products and transmit the information to the appropriate storage and retrieval apparatus as described above. In response to the storage and retrieval apparatus receiving the information associated with the supplemental products, via the transceiver, the processor of the storage and retrieval apparatus can identify the products of the supplemental products stored within the storage and retrieval apparatus, by querying the repository. The storage and retrieval apparatus can identify one or more products of the supplemental products that are not stored within it based on the query of the repository, but rather that are stored in a different one of the storage and retrieval apparatuses. For embodiments in which storage towers 100 *a* and 100 *b* are arranged as shown in FIG. 3A, the storage tower 100 *a* can transmit a request, via the transceiver 775, to another storage tower 100 *b* for the one or more products to be transferred to the storage tower 100 *a*. The one or more products can be transferred to the storage tower 100 *a* as described herein.

Upon receiving the one or more products, the controller 770 of storage tower 100 *a* can generate and transmit an alert. In one embodiment, the alert can include information associated with the supplemental products, to inform the customer of the availability of the products at the storage tower 100 *a*.

In one embodiment, as described above, the customer can input information associated with purchasing products using the user device 755 executing the application 761. The input information can be transmitted to the computing system 700 to identify supplemental products.

In one embodiment, as described above, the customer can traverse the retail store with a shopping cart or basket loaded with products to be purchased. The reader (e.g., reader 214, 506) of a storage and retrieval apparatus can scan identifiers of products disposed in the cart or basket as the cart or basket passes by the storage and retrieval apparatus. The scanned information can be transmitted to the computing system 700 to identify supplemental products.

In one embodiment, the routing engine 720 can query the physical objects database 725 to determine each of the products purchased a specified retail store over a period of time. The routing engine 720 can determine correlation or trend related information associated with the retail store. For example, the routing engine 720 can determine the demographics frequenting the retail store, locations of the stores which are frequented by certain demographics, types of items purchased, and other correlation or trend related information associated with the retail store. The routing engine 720 can transmit instructions to load specific storage and retrieval apparatus with specified products based on the correlation or trend related information associated with the retail store. As a non-limiting example, the routing engine 720 can transmit instructions to load products geared towards men in a storage and retrieval apparatus located in an area of the retail store frequented often by men.

Figure 8:
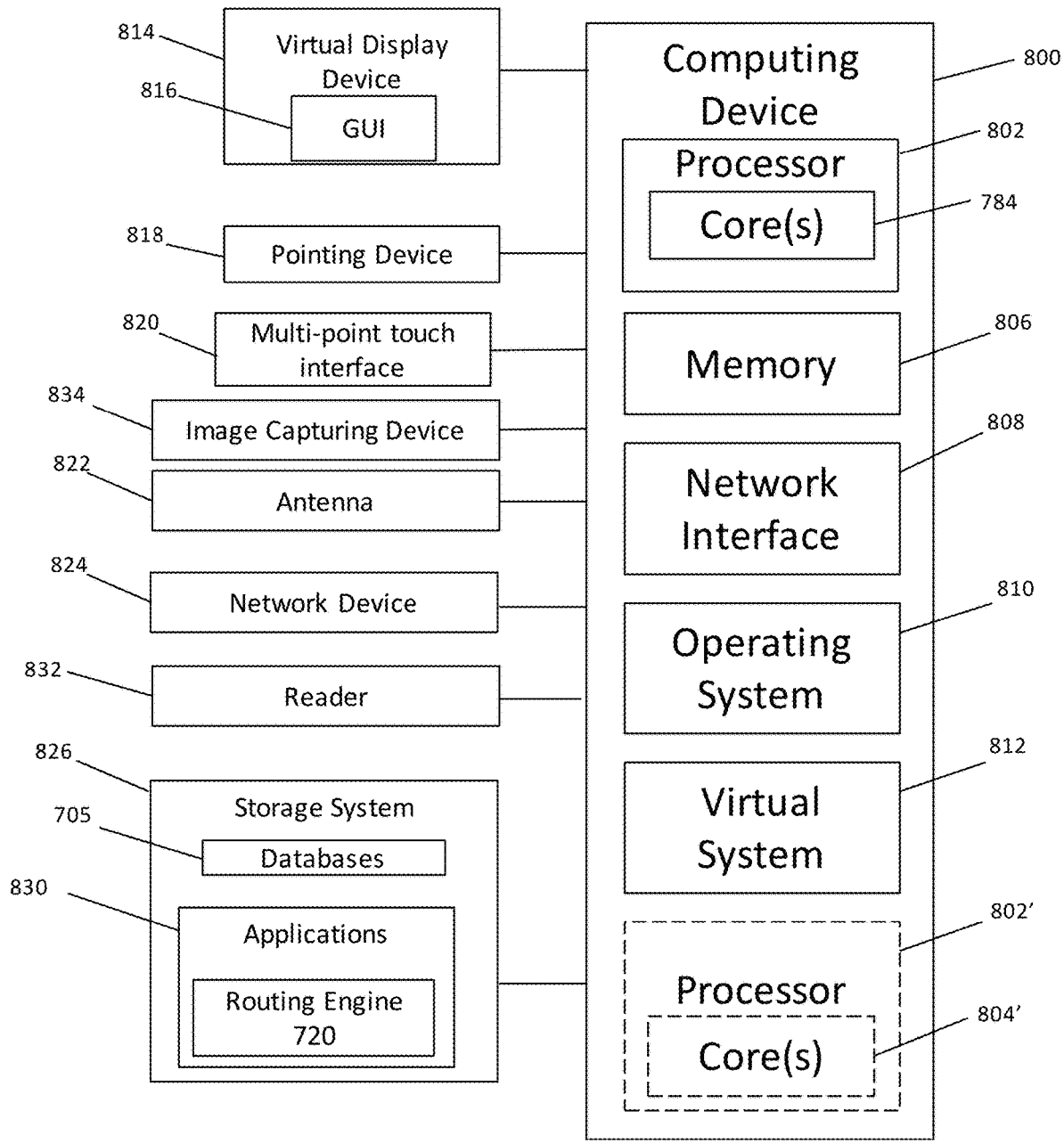
FIG. 8 is a block diagram illustrating of an exemplary computing device in accordance with an exemplary embodiment.

FIG. 8 is a block diagram of an example computing device for implementing exemplary embodiments of the present disclosure. The computing device 800 may be, but is not limited to, a smartphone, laptop, tablet, desktop computer, server or network appliance. The computing device 800 can be embodied as part of the computing system, user device, or storage and retrieval apparatus. The computing device 800 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 806 included in the computing device 800 may store computer-readable and computer-executable instructions or software (e.g., applications 830 such as the routing engine 720) for implementing exemplary operations of the computing device 800. The computing device 800 also includes configurable and/or programmable processor 802 and associated core(s) 804, and optionally, one or more additional configurable and/or programmable processor(s) 802' and associated core(s) 804' (for example, in the case of computer systems having multiple processors/cores), for executing computer-readable and computer-executable instructions or software stored in the memory 806 and other programs for implementing exemplary embodiments of the present disclosure. The processor 802 and the processor(s) 802' may each be a single core processor or multiple core (804 and 804') processor. Either or both of the processor 802 and the processor(s) 802' may be configured to execute one or more of the instructions described in connection with computing device 800.

Virtualization may be employed in the computing device 800 so that infrastructure and resources in the computing device 800 may be shared dynamically. A virtual machine 812 may be provided to handle a process running on multiple processors so that the process appears to be using only one computing resource rather than multiple computing resources. Multiple virtual machines may also be used with one processor.

Memory 806 may include a computer system memory or random access memory, such as DRAM, SRAM, EDO RAM, and the like. Memory 806 may include other types of memory as well, or combinations thereof.

A user may interact with the computing device 800 through a visual display device 814, such as a computer monitor, which may display one or more graphical user interfaces 816, multi touch interface 820, a pointing device 818, an image capturing device 834 and a scanner 832.

The computing device 800 may also include one or more computer storage devices 826, such as a hard-drive, CD-ROM, or other computer readable media, for storing data and computer-readable instructions and/or software that implement exemplary embodiments of the present disclosure (e.g., applications such as routing engine 720 as shown in FIG. 7 and application 761 as shown in FIG. 7). For example, exemplary storage device 826 can include one or more databases 705 for storing information regarding physical objects and the storage and retrieval apparatuses. The databases 828 may be updated manually or automatically at any suitable time to add, delete, and/or update one or more data items in the databases.

The computing device 800 can include a network interface 808 configured to interface via one or more network devices 824 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 822 to facilitate wireless communication (e.g., via the network interface) between the computing device 800 and a network and/or between the computing device 800 and other computing devices. The network interface 808 may include a built-in network adapter, network interface card, PCMCIA network card, card bus network adapter, wireless network adapter, USB network adapter, modem or any other device suitable for interfacing the computing device 800 to any type of network capable of communication and performing the operations described herein.

The computing device 800 may run any operating system 810, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or any other operating system capable of running on the computing device 800 and performing the operations described herein. In exemplary embodiments, the operating system 810 may be run in native mode or emulated mode. In an exemplary embodiment, the operating system 810 may be run on one or more cloud machine instances.

Figure 9:
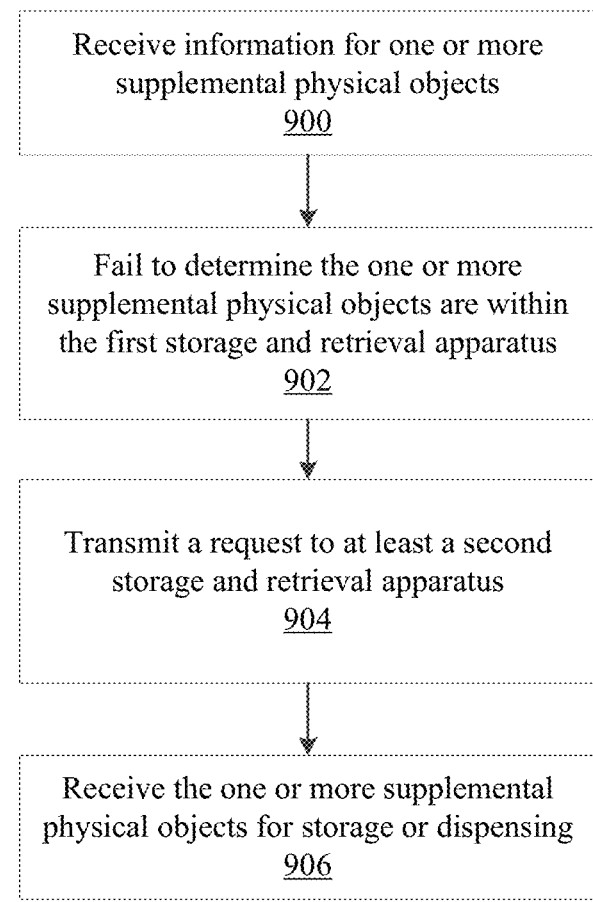
FIG. 9 is a flowchart illustrating an exemplary process in accordance with an exemplary embodiment.

FIG. 9 is a flowchart illustrating a process of the autonomous storage and retrieval system according to exemplary embodiment. In operation 800, a first storage and retrieval apparatus (e.g., storage tower 100 or storage locker apparatus 200) can receive information for one or more supplemental physical objects based on identities of a first set of physical object external to the first storage and retrieval apparatus. In operation 802, the first storage and retrieval apparatus can fail to determine the one or more supplemental physical objects are within the first storage and retrieval apparatus. In operation 804, the first storage and retrieval apparatus can transmit a request to at least a second storage and retrieval apparatus (e.g., another storage tower 100 or another storage locker apparatus 200) for the one or more supplemental physical objects. In operation 806, the first storage and retrieval apparatus can receive the one or more supplemental physical objects for storage or dispensing. In some embodiments, the one or more supplemental physical objects can be autonomously transported from the second storage and retrieval apparatus to the first storage and retrieval apparatus in response to the request. In operation 808, the first storage and retrieval apparatus can generate an alert for the user to indicate that the one or more supplemental physical objects are available at the first storage apparatus.

Figure 10:
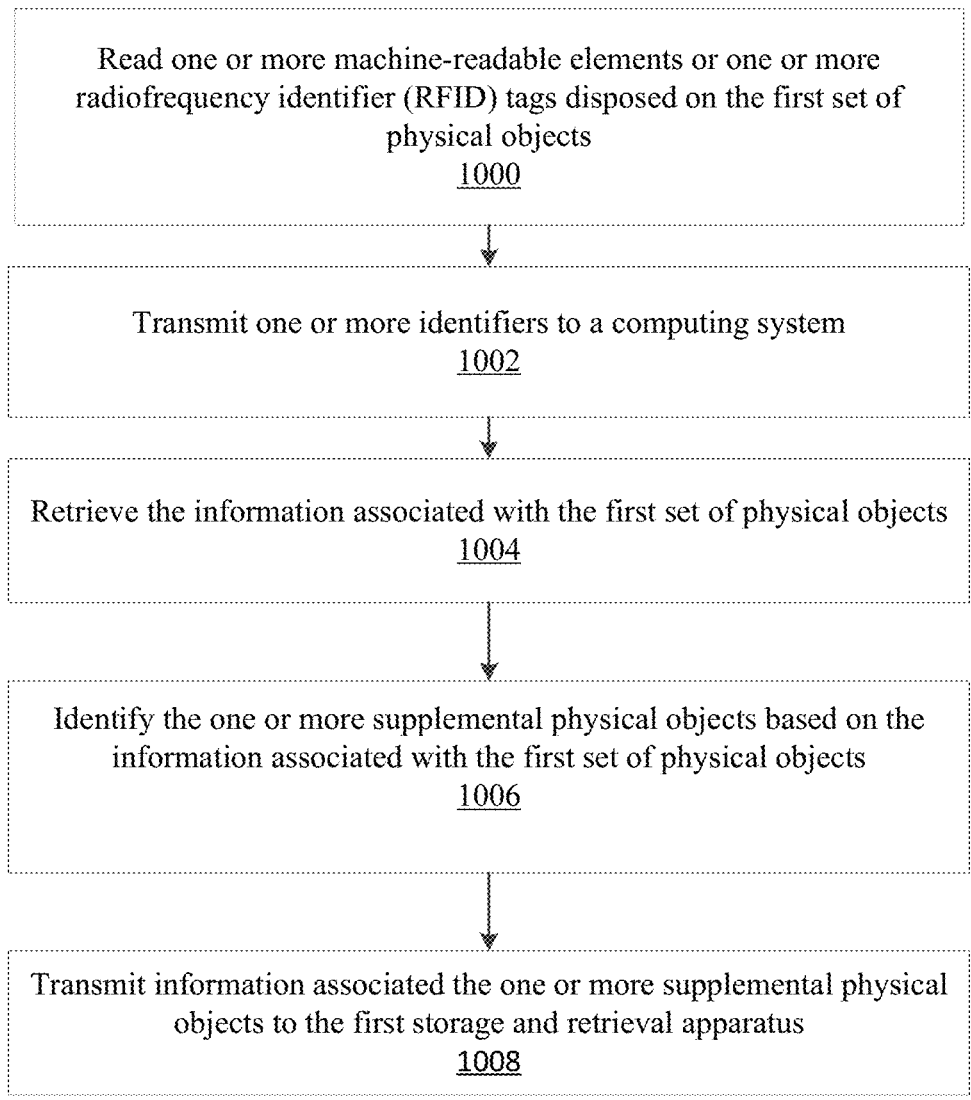
FIG. 10 is a flowchart illustrating an exemplary process in accordance with an exemplary embodiment.

FIG. 10 is a flowchart illustrating the process of the autonomous storage and retrieval system according to exemplary embodiment. In operation 1000, a first storage and retrieval apparatus (e.g., storage tower 100 or storage locker apparatus 200) can read one or more machine-readable elements or one or more radiofrequency identifier (RFID) tags disposed on the first set of physical objects as a cart including the first set of physical objects traverses passed a reader (e.g., reader 506 or reader 214) associated with the first storage and retrieval apparatus. In operation 1002, the first storage and retrieval apparatus can transmit one or more identifiers associated with the one or more machine readable elements or the one or more RFID tags read by the reader to a computing system (e.g., computing system 700 as shown in FIG. 7). In operation 1004, the computing system can query the database (e.g., physical objects and/or apparatus databases 725, 735 as shown in FIG. 7) using the one or more identifiers to retrieve the information associated with the first set of physical objects. In operation 1006, the computing system can identify the one or more supplemental physical objects based on the information associated with the first set of physical objects. In operation 1008, the computing system can transmit information associated with the one or more supplemental physical objects to the first storage and retrieval apparatus, which can alert the user via the display that the storage and retrieval apparatus includes the one or more supplemental physical object.

Figure 11:
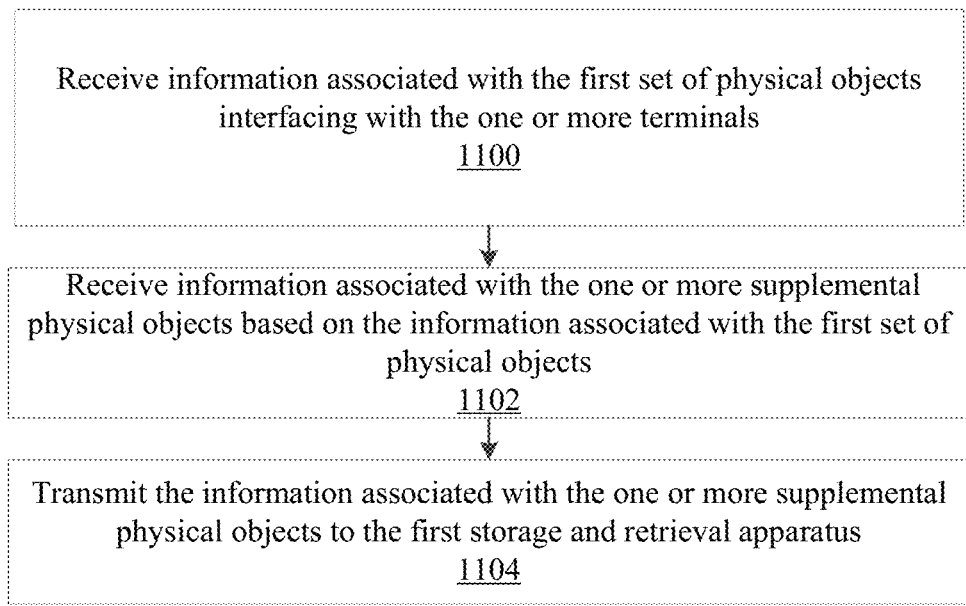
FIG. 11 is a flowchart illustrating the process of the autonomous storage and retrieval system according to exemplary embodiment.

FIG. 11 is a flowchart illustrating the process of the autonomous storage and retrieval system according to exemplary embodiment. In operation 1100, one or more terminals (e.g., terminals 740 as shown in FIG. 7), in communication with the storage and retrieval apparatus, can receive information associated with the first set of physical objects interfacing with the one or more terminals. In operation 1102, the one or more terminals can receive information associated with the one or more supplemental physical objects based on the information associated with the first set of physical objects. In operation 1104, the one or more terminals can transmit the information associated with the one or more supplemental physical objects to the storage and retrieval apparatus and the storage and retrieval apparatus can alert the user via the display that the storage and retrieval apparatus includes at least one of the one or more supplemental physical object.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

One or more of the exemplary embodiments, include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system may be reduced significantly. For example, whenever a localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data may include a key kernel index summary of the data as created under nominal conditions. In an exemplary embodiment, the kernel encodes relatively recently acquired intermittent data ("KRI"). As a result, in an exemplary embodiment, KM is a continuously utilized near term source of data, but KM may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data in order to filter out data that may reflect generic background data. In an exemplary embodiment, KRG incrementally sequences all future undefined cached kernels having encoded asynchronous data in order to filter out data that may reflect generic background data.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An object storage and retrieval system, the system comprising:
    a plurality of storage and retrieval apparatuses configured to store and dispense a plurality of physical objects, wherein a first storage and retrieval apparatus of the plurality of storage and retrieval apparatuses is configured to:
        receive information for one or more physical objects based on identities of a first set of physical objects;
        transmit a request to at least a second storage and retrieval apparatus of the plurality of storage and retrieval apparatuses for the one or more physical objects; and
        receive, at the first storage and retrieval apparatus, the one or more physical objects from the second storage and retrieval apparatus; and
    wherein the first storage and retrieval apparatus comprises multiple lockers, and the second storage and retrieval apparatus comprises a shelving unit and a transport apparatus;
    wherein the one or more physical objects are transported from the second storage and retrieval apparatus to the first storage and retrieval apparatus in response to the request; and
    wherein the first storage and retrieval apparatus comprises a first receptacle, and the second storage and retrieval apparatus comprises a second receptacle, and the one or more physical objects are transported, by the transport apparatus through the second storage and retrieval apparatus and the second receptacle, to the first storage and retrieval apparatus and positioned into a first locker of the multiple lockers of the first storage and retrieval apparatus in response to the request.

2. The system of claim 1, further comprising one or more terminals in communication with the plurality of storage and retrieval apparatuses, the one or more terminals configured to:
    receive information associated with the first set of physical objects interfacing with the one or more terminals;
    receive additional information associated with the one or more physical objects based on the information associated with the first set of physical objects; and
    transmit the additional information associated with the one or more physical objects to the first storage and retrieval apparatus.

3. The system of claim 1, further comprising a computing system including a database in communication with the plurality of storage and retrieval apparatuses.

4. The system of claim 3, wherein the plurality of storage and retrieval apparatuses each further include a respective reader, and the first storage and retrieval apparatus is further configured to:
    read one or more machine-readable elements or one or more radio frequency identifier (RFID) tags disposed on the first set of physical objects, as the first set of physical objects traverses past the reader associated with the first storage and retrieval apparatus; and
    transmit to the computing system one or more identifiers associated with the one or more machine-readable elements or the one or more RFID tags read by the reader of the first storage and retrieval apparatus.

5. The system of claim 4, wherein the computing system is configured to:
    query the database using the one or more identifiers to retrieve the information associated with the first set of physical objects;
    identify the one or more physical objects based on the information associated with the first set of physical objects; and
    transmit the information associated the one or more physical objects to the first storage and retrieval apparatus.

6. The system of claim 1, further comprising a user device including an optical scanner, the user device being configured to:
    execute an application; and
    scan the first set of physical objects using the optical scanner.

7. The system of claim 6, wherein the first storage and retrieval apparatus is configured to:
    receive scanned identifiers of the first set of physical objects from the application executed on the user device based on the scanning of the first set of physical objects; and
    identify the information for the one or more physical objects based on the scanned identifiers of the first set of physical objects.

8. The system of claim 1, wherein:
    the second storage and retrieval apparatus comprises a second storage tower;
    wherein the second storage tower comprises a second housing, the shelving unit disposed within the second housing, a second controller, the transport apparatus, a second input device, and a second interactive display; and
    wherein the one or more physical objects are autonomously transported from the second storage tower to the first locker in response to the request.

9. The system of claim 1, wherein the first receptacle is configured to be aligned with the second receptacle.

10. The system of claim 9, wherein the second storage tower is configured to transport, via the transport apparatus of the second storage tower, the one or more physical objects to the second receptacle of the second storage tower.

11. The system of claim 10, wherein the first storage and retrieval apparatus is configured to receive the one or more physical objects, via the first receptacle aligned to the second receptacle of the second storage tower.

12. An object storage and retrieval method, the method comprising:
- receiving, via a first storage and retrieval apparatus of a plurality of storage apparatuses, information for one or more physical objects based on identities of a first set of physical objects, the first storage and retrieval apparatus comprising multiple lockers and a first receptacle;
- transmitting, via the first storage and retrieval apparatus, a request to at least a second storage and retrieval apparatus of the plurality of storage apparatuses for the one or more physical objects wherein the second storage and retrieval apparatus comprising a shelving unit and a transport apparatus;
- transporting, by the transport apparatus through the second storage and retrieval apparatus and through a second receptacle, the one or more physical objects from the second storage and retrieval apparatus in response to the request;
- receiving, via the first storage and retrieval apparatus and from the second storage and retrieval apparatus, the one or more physical objects; and
- positioning the one or more physical objects into a first locker of the multiple lockers of the first storage and retrieval apparatus.

13. The method of claim 12, further comprising:
- receiving, via one or more terminals in communication with the plurality of storage apparatuses, information associated with the first set of physical objects interfacing with the one or more terminals;
- receiving, via the one or more terminals, additional information associated with the one or more physical objects based on the information associated with the first set of physical objects; and
- transmitting, via the one or more terminals, the additional information associated with the one or more physical objects to the first storage and retrieval apparatus.

14. The method of claim 12, wherein the receiving the information for the one or more physical objects comprises accessing a database of a computing system and acquiring the information for the one or more physical objects through the computing system.

15. The method of claim 14, further comprising:
- reading, via a reader of the first storage and retrieval apparatus, one or more machine-readable elements or one or more radio frequency identifier (RFID) tags disposed on the first set of physical objects, as the first set of physical objects traverses past the reader associated with the first storage and retrieval apparatus; and
- transmitting to the computing system, via the first storage and retrieval apparatus, one or more identifiers associated with the one or more machine-readable elements or the one or more RFID tags read by the reader.

16. The method of claim 15, further comprising:
- querying, via the computing system, the database using the one or more identifiers to retrieve the information associated with the first set of physical objects;
- identifying, via the computing system, the one or more physical objects based on the information associated with the first set of physical objects; and
- transmitting, via the computing system, the information associated the one or more physical objects to the first storage and retrieval apparatus.

17. The method of claim 12, further comprising:
- executing, via a user device including an optical scanner, an application; and
- scanning, via the optical scanner of the user device, the first set of physical objects using the optical scanner.

18. The method of claim 17, further comprising:
- receiving, via the first storage and retrieval apparatus, scanned identifiers of the first set of physical objects from the application executed on the user device based on the scanning of the first set of physical objects; and
- identifying, via the first storage and retrieval apparatus, the information for the one or more physical objects based on the scanned identifiers of the first set of physical objects.

19. The method of claim 12,
- wherein the transporting, via the transport apparatus of the second storage and retrieval apparatus, comprises transporting the one or more physical objects to the second receptacle; and
- wherein the receiving, via the first storage and retrieval apparatus the one or more physical objects, comprise receiving, via the first receptacle aligned with the second receptacle, the one or more physical objects at the first storage and retrieval apparatus.

\* \* \* \* \*